US012671196B2

(12) United States Patent
Tsunemura

(10) Patent No.: US 12,671,196 B2
(45) Date of Patent: Jun. 30, 2026

(54) CONNECTOR AND ELECTRONIC APPARATUS

(71) Applicant: KYOCERA CORPORATION, Kyoto (JP)

(72) Inventor: Akio Tsunemura, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 346 days.

(21) Appl. No.: 18/579,309

(22) PCT Filed: Jul. 5, 2022

(86) PCT No.: PCT/JP2022/026748
§ 371 (c)(1),
(2) Date: Jan. 12, 2024

(87) PCT Pub. No.: WO2023/286664
PCT Pub. Date: Jan. 19, 2023

(65) Prior Publication Data
US 2024/0347941 A1 Oct. 17, 2024

(30) Foreign Application Priority Data
Jul. 16, 2021 (JP) ................................ 2021-118325

(51) Int. Cl.
*H01R 12/71* (2011.01)
*H01R 13/405* (2006.01)
*H01R 13/631* (2006.01)

(52) U.S. Cl.
CPC ......... *H01R 12/716* (2013.01); *H01R 13/405* (2013.01); *H01R 13/631* (2013.01)

(58) Field of Classification Search
CPC ... H01R 12/716; H01R 13/405; H01R 13/631
(Continued)

(56) References Cited

U.S. PATENT DOCUMENTS 9,899,771 B2 * 2/2018 Ashibu .................. H01R 13/50
10,249,969 B2 * 4/2019 Ono ..................... H01R 13/504
(Continued)

FOREIGN PATENT DOCUMENTS

JP 2017168210 A 9/2017
JP 2018190642 A 11/2018
(Continued)

*Primary Examiner* — Gary F Paumen
(74) *Attorney, Agent, or Firm* — Duane Morris LLP

(57) ABSTRACT

A connector according to the present disclosure includes an insulator and a first metal fitting. The insulator includes an engagement projection projecting toward an engagement side where the connector engages a connection object and a peripheral wall surrounding the engagement projection. The first metal fitting is attached to the engagement projection. The engagement projection includes a first face that is an end face facing the engagement side, a second face and a third face both extending from respective edges of the first face, the respective edges extending in a longitudinal direction of the connector, and a fourth face extending from an edge of the first face, the edge extending in a transverse direction of the connector. The first metal fitting includes a first end portion positioned at a first intersection portion. The first metal fitting also includes a second end portion positioned at a second intersection portion.

14 Claims, 12 Drawing Sheets

(58) Field of Classification Search
USPC ........................................................ 439/55, 74
See application file for complete search history.

(56) References Cited

U.S. PATENT DOCUMENTS

| | | | | |
|---|---|---|---|---|
| 10,651,579 | B2 * | 5/2020 | Ono ..................... | H01R 13/504 |
| 10,756,466 | B2 * | 8/2020 | Ono ..................... | H01R 13/631 |
| 10,847,917 | B2 * | 11/2020 | Ishida .................. | H01R 12/716 |
| 2019/0363467 | A1 | 11/2019 | Ko et al. | |

FOREIGN PATENT DOCUMENTS

| | | | |
|---|---|---|---|
| JP | 6498622 | B2 | 4/2019 |
| JP | 2020077490 | A | 5/2020 |
| KR | 20170106911 | A | 9/2017 |
| KR | 20180123980 | A | 11/2018 |

* cited by examiner

10

CONNECTOR AND ELECTRONIC APPARATUS

CROSS-REFERENCE TO RELATED APPLICATIONS

This application claims the benefit of Japanese Patent Application No. 2021-118325 filed Jul. 16, 2021, which is hereby incorporated by reference herein in its entirety.

TECHNICAL FIELD

The present disclosure relates to a connector and an electronic apparatus.

BACKGROUND OF INVENTION

An art of a connector module that includes a connector and a connection object is known widely. The connector and the connection object are mounted on different circuit substrates, and the connector module electrically connects the different circuit substrates to each other. For example, Patent Literature 1 discloses a connector that can reduce the occurrence of breakage of an island portion or the like when the connector engages a counterpart connector in a misaligned state.

Electronic apparatuses, such as mobile devices, have been subjected to weight and size reduction in recent years, and connectors mounted in the electronic apparatuses are expected to be reduced in size and height.

CITATION LIST

Patent Literature

Patent Literature 1: Japanese Patent No. 6498622

SUMMARY

According to an embodiment of the present disclosure, a connector configured to engage a connection object includes an insulator and a first metal fitting. The insulator includes an engagement projection projecting toward an engagement side where the connector engages the connection object. The insulator also includes a peripheral wall surrounding the engagement projection. The first metal fitting is attached to the engagement projection. The engagement projection includes a first face that is an end face facing the engagement side, a second face and a third face both extending toward a side opposite to the engagement side from respective edges of the first face, the respective edges extending in a longitudinal direction of the connector, and a fourth face extending toward the side opposite to the engagement side from an edge of the first face, the edge extending in a transverse direction of the connector. The first metal fitting includes a first end portion positioned at a first intersection portion at which the first face, the second face, and the fourth face intersect. The first end portion covers part of the first face, part of the second face, and part of the fourth face. The first metal fitting also includes a second end portion positioned at a second intersection portion at which the first face, the third face, and the fourth face intersect. The second end portion covers part of the first face, part of the third face, and part of the fourth face.

An electronic apparatus according to an embodiment of the present disclosure includes the above connector.

DESCRIPTION OF EMBODIMENTS

Connectors are subjected to size and height reduction. As a result, components of a connector, such as metal fittings or an insulator, tend to be broken easily when, for example, the connector hits a connection object during the engagement between the connector and the connection object. For example, in the connector disclosed in Patent Literature 1, a reinforcement member is disposed so as to cover the top surface and a transversal side surface of a corner portion of an engagement projection (island portion) of an insulator, the transversal side surface extending in the transverse direction of the connector. However, the reinforcement member is not disposed to cover the other side surfaces of the connector, the other side surfaces extending in the longitudinal direction. Accordingly, the insulator is exposed partially at the corner portion of the engagement projection, which is disadvantageous in protection. This may lead to a problem, such as breakage of the insulator, when a connection object hits the insulator during engagement or disengagement between the connector and the connection object.

According to an embodiment of the present disclosure, the sturdiness of the connector and the electronic apparatus can be improved even in the case of the connector being reduced in size and height.

Figure 10:
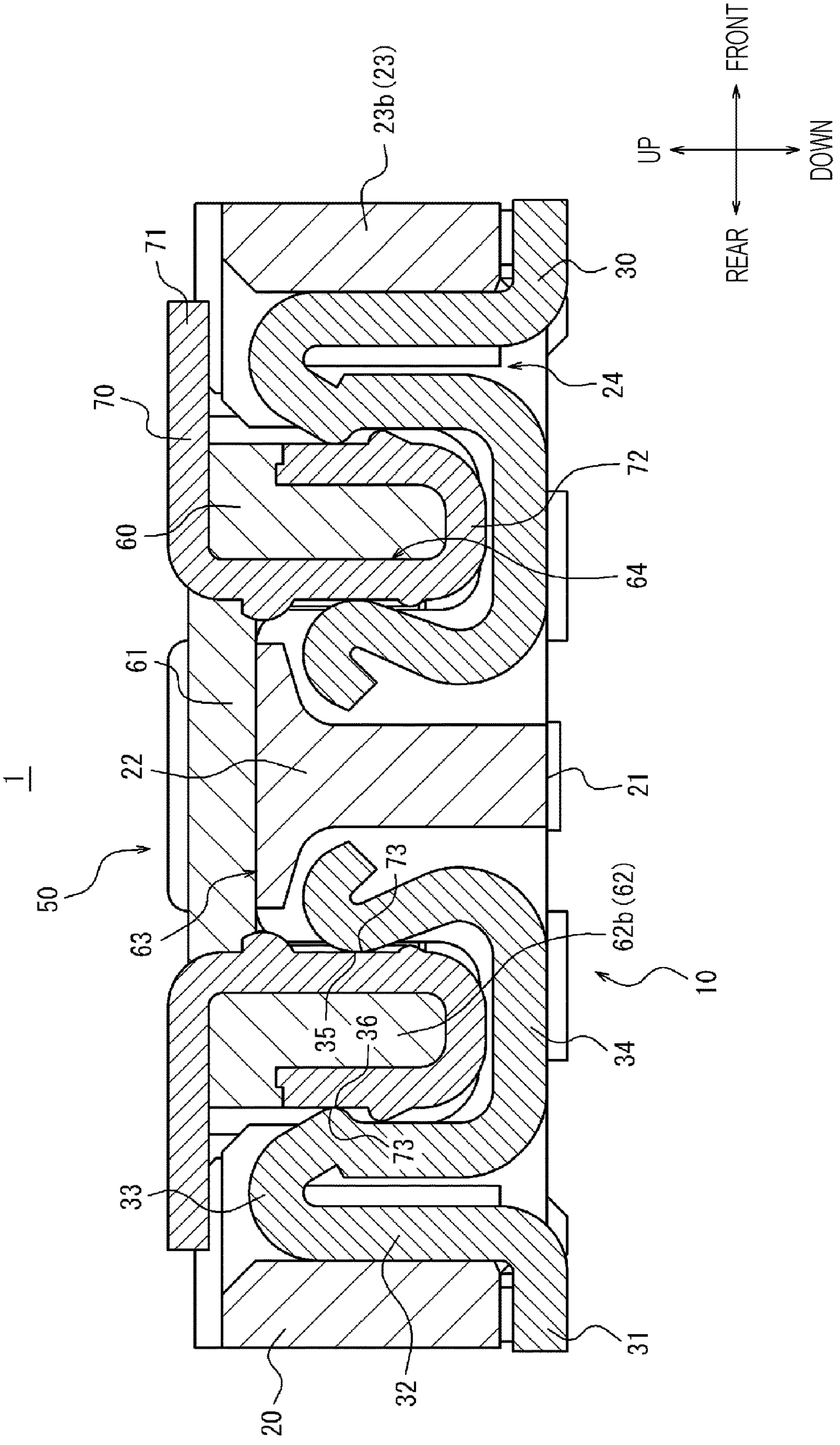
FIG. 10 is a cross-sectional view of the connector module taken along line X-X in FIG. 1.
Figure 11:
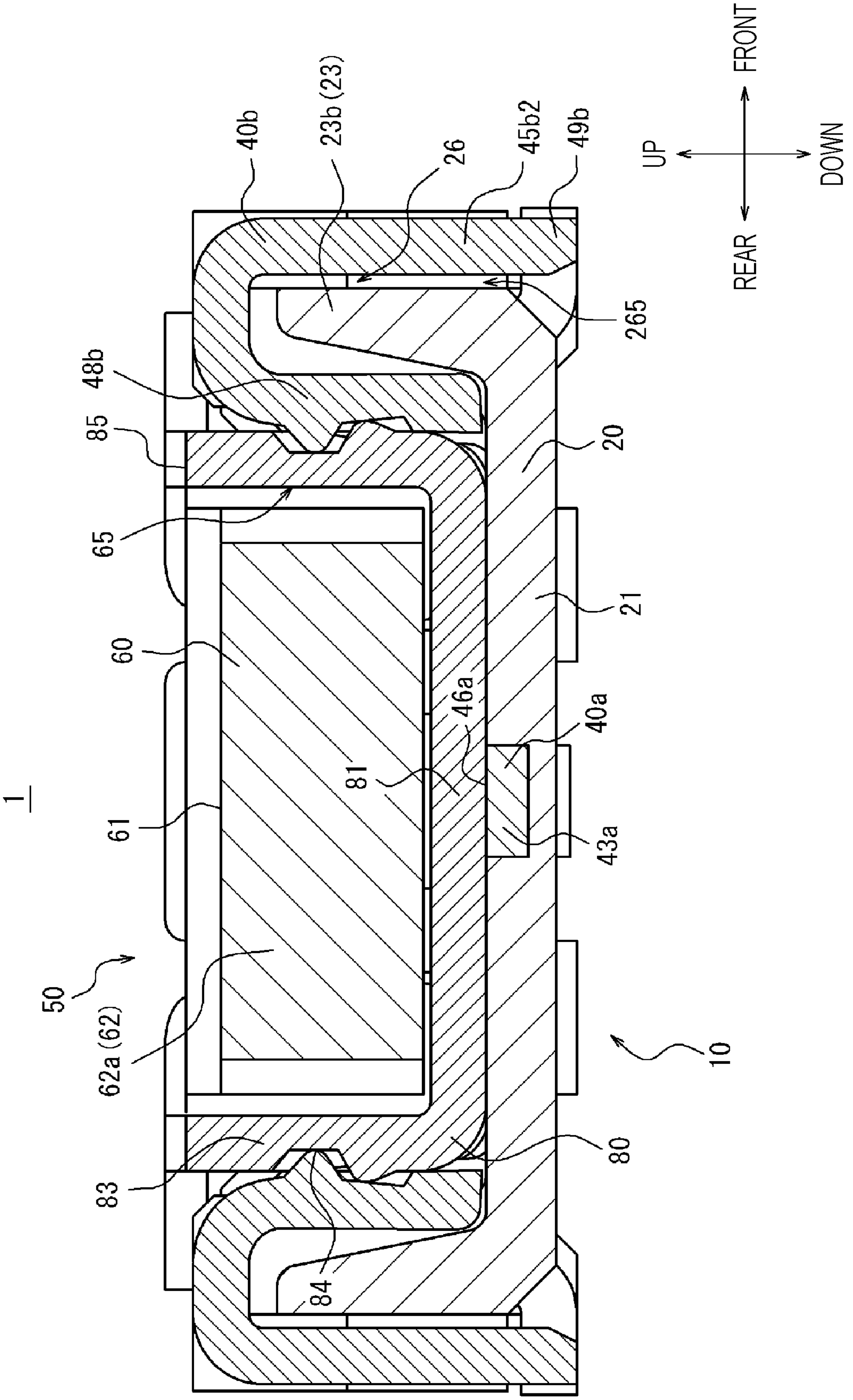
FIG. 11 is a cross-sectional view of the connector module taken along line XI-XI in FIG. 1.
Figure 12:
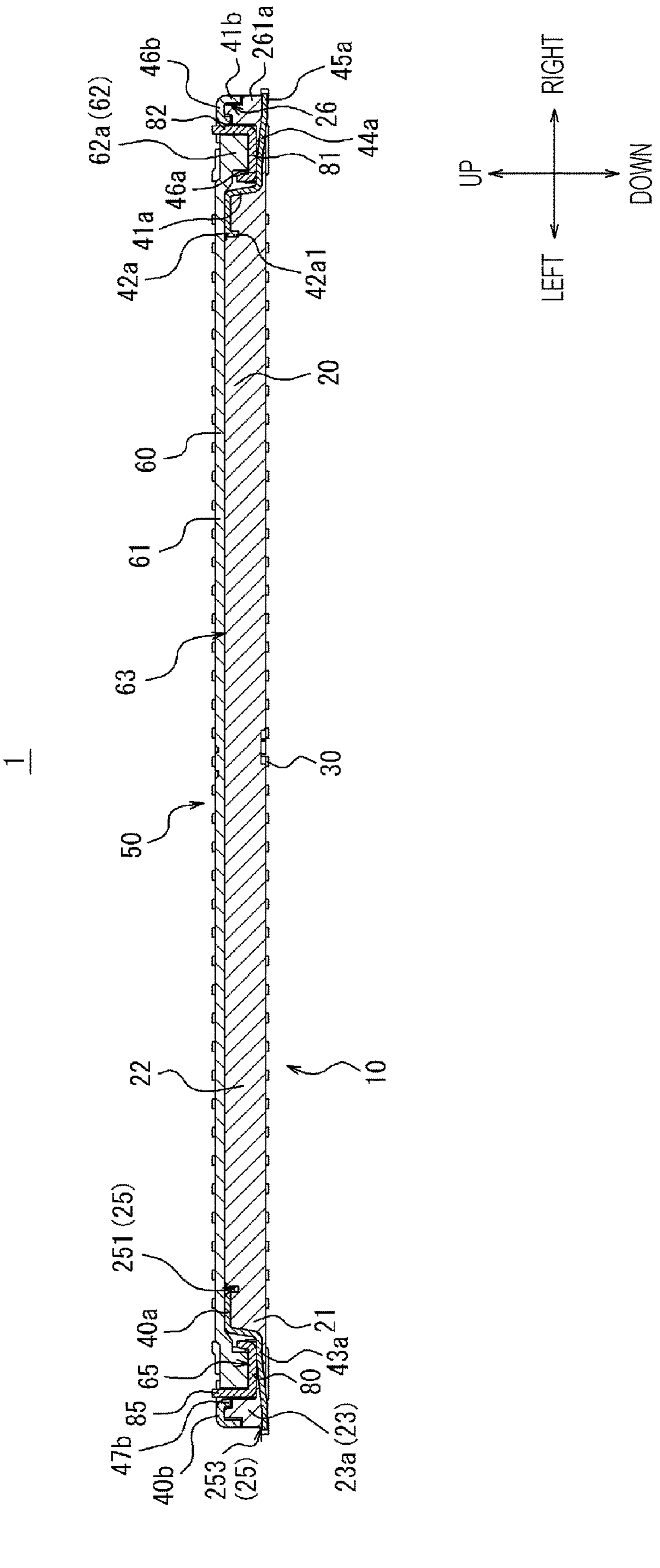
FIG. 12 is a cross-sectional view of the connector module taken along line XII-XII in FIG. 1.

The following describes an embodiment of the present disclosure in detail with reference to the drawings. In the following description, the front-rear direction, the right-left direction, and the up-down direction are defined with reference to the directions of arrows in the drawings. The directions of arrows in FIGS. 1 to 8 and in FIGS. 10 to 12 are aligned each other with corresponding arrows in different figures. In some drawings, illustration of circuit substrates CB1 and CB2 (to be described later) is omitted to facilitate easy understanding.

Figure 1:
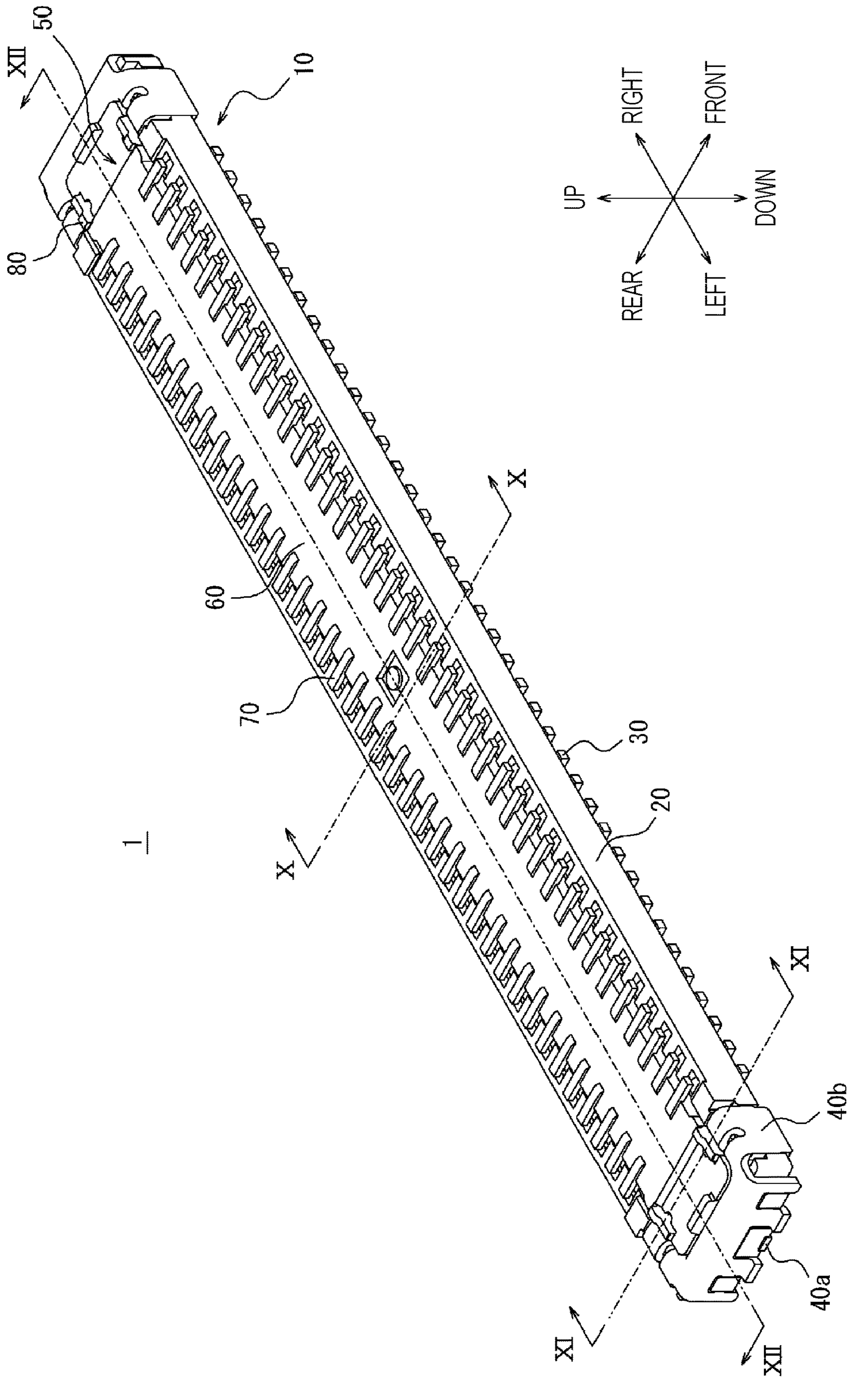
FIG. 1 is a perspective view, as viewed from above, illustrating the exterior of a connector module according to an embodiment, in which a connector and a connection object are connected to each other.
Figure 2:
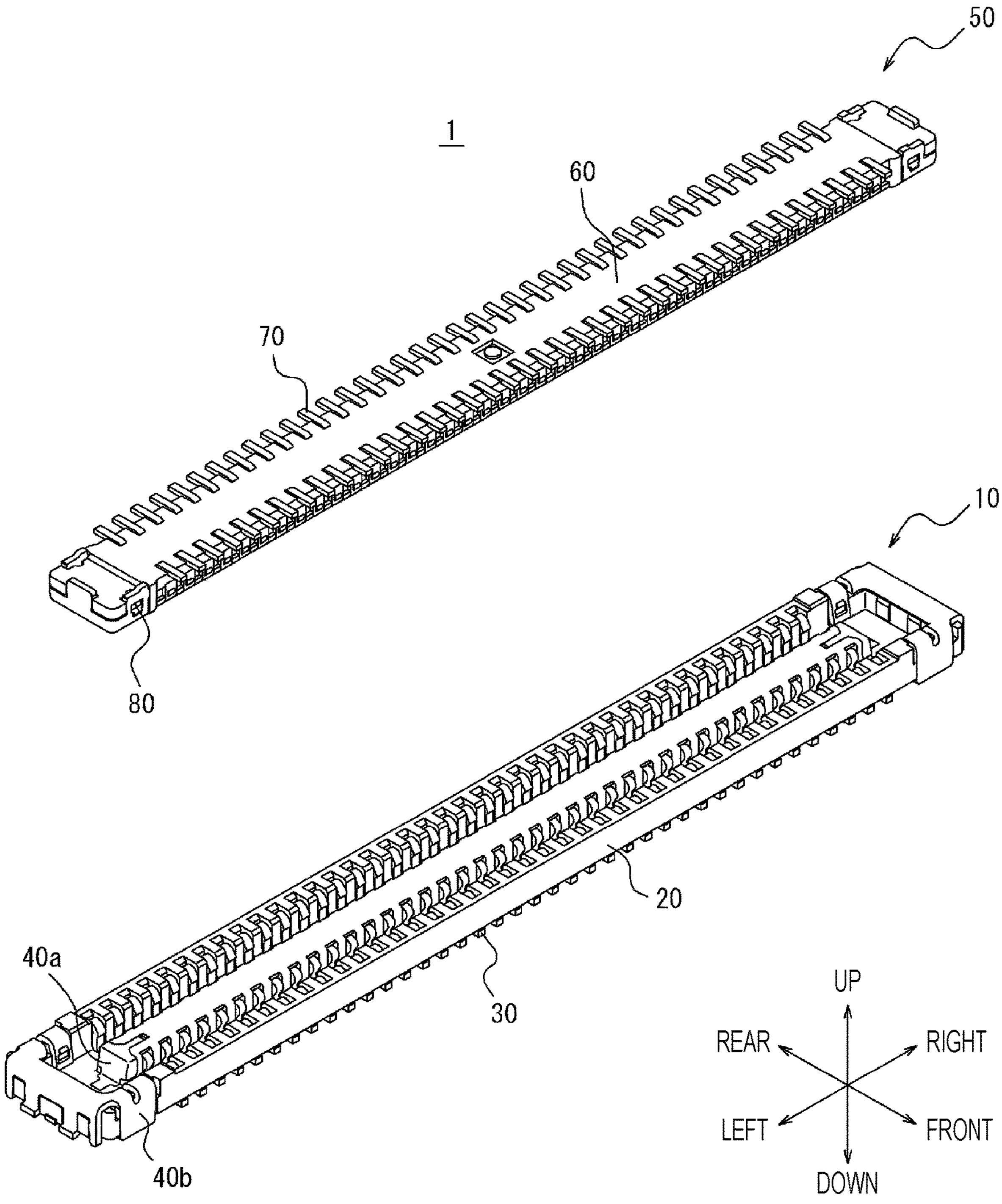
FIG. 2 is a perspective view, as viewed from above, illustrating the exterior of the connector module according to the embodiment, in which the connector and the connection object are separated from each other.

FIG. 1 is a perspective view, as viewed from above, illustrating the exterior of a connector module 1 according to an embodiment, in which a connector 10 and a connection object 50 are connected to each other. FIG. 2 is a perspective view, as viewed from above, illustrating the exterior of the connector module 1 according to the embodiment, in which the connector 10 and the connection object 50 are separated from each other.

For example, as illustrated in FIG. 2, the connector module 1 includes the connector 10 and the connection object 50 that are configured to be connected to each other. The connector 10 includes a first insulator 20 and first contacts 30 attached to the first insulator 20. The connector 10 also includes first metal fittings 40*a* and second metal fittings 40*b*, and these fittings are attached to the first insulator 20.

The connection object 50 is connectable to the connector 10. The connection object 50 includes a second insulator 60. The second insulator 60 engages the first insulator 20 in a connection state in which the connector 10 and the connection object 50 are connected to each other. The connection object 50 also includes second contacts 70 attached to the second insulator 60. The second contacts 70 are in contact with respective first contacts 30 in an engagement state in which the first insulator 20 engages the second insulator 60. The connection object 50 further includes metal fittings 80 attached to the second insulator 60. Each metal fitting 80 is in contact with a first metal fitting 40*a* and a second metal fitting 40*b* in the engagement state. This causes the second metal fitting 40*b* to deform elastically.

In the following description, the connector 10 of the embodiment is assumed to be a receptacle connector by way of example. The connection object 50 is assumed to be a plug connector by way of example. More specifically, in the engagement state in which the first insulator 20 and the second insulator 60 engage each other, the connector 10 in which the first contacts 30 are deformed elastically is assumed to be the receptacle connector. The connection object 50 in which the second contacts 70 are not deformed elastically in the engagement state is assumed to be the plug connector. The types of the connector 10 and the connection object 50 are not limited to those described above. For example, the connector 10 may serve as the plug connector, while the connection object 50 may serve as the receptacle connector.

The connection object 50 is not limited to the above but can be a connection object other than the plug connector or the receptacle connector. For example, the connection object 50 can be a flexible printed circuit board (FPC), a flexible flat cable, a rigid board, or a card edge connector of an arbitrary circuit substrate.

In the following description, the connector 10 and the connection object 50 are assumedly mounted on circuit substrates CB1 and CB2, respectively. The circuit substrate CB1 and the circuit substrate CB2 are electrically coupled to each other in the connection state in which the connector 10 and the connection object 50 are connected to each other. The circuit substrates CB1 and CB2 may be rigid substrates or may be any arbitrary circuit substrates other than the rigid substrates. For example, at least one of the circuit substrates CB1 and CB2 may be an FPC.

In the following description, the connector 10 and the connection object 50 are assumedly connected to each other in a direction normal to the circuit substrates CB1 and CB2. The connector 10 and the connection object 50 are connected to each other, for example, in the up-down direction. The direction of connection is not limited to the up-down direction. The connector 10 and the connection object 50 may be connected to each other in a direction parallel to the circuit substrates CB1 and CB2. The connector 10 and the connection object 50 may be connected to each other in such a manner that one of the connector 10 and the connection object 50 is mounted vertically onto a circuit substrate and the other is mounted horizontally onto the other circuit substrate.

As used in the claims, the term "longitudinal direction" corresponds, for example, to the right-left direction. For example, the term "transverse direction" corresponds to the front-rear direction. For example, the term "engagement side" corresponds to an upper side. For example, the term "side opposite to the engagement side" corresponds to a lower side. For example, the term "surface facing the circuit substrate CB1" corresponds to a surface facing downward. For example, the term "first face" corresponds to a surface facing upward. For example, the term "second face" corresponds to a surface facing rearward. For example, the term "third face" corresponds to a surface facing frontward. For example, the term "fourth face" corresponds to a surface facing rightward or leftward. For example, the term "first flat surface" corresponds to a surface facing upward. For example, the term "second flat surface" corresponds to a surface facing rearward. For example, the term "third flat surface" corresponds to a surface facing frontward. For example, the term "fourth flat surface" corresponds to a side surface facing rightward or leftward.

Figure 3:
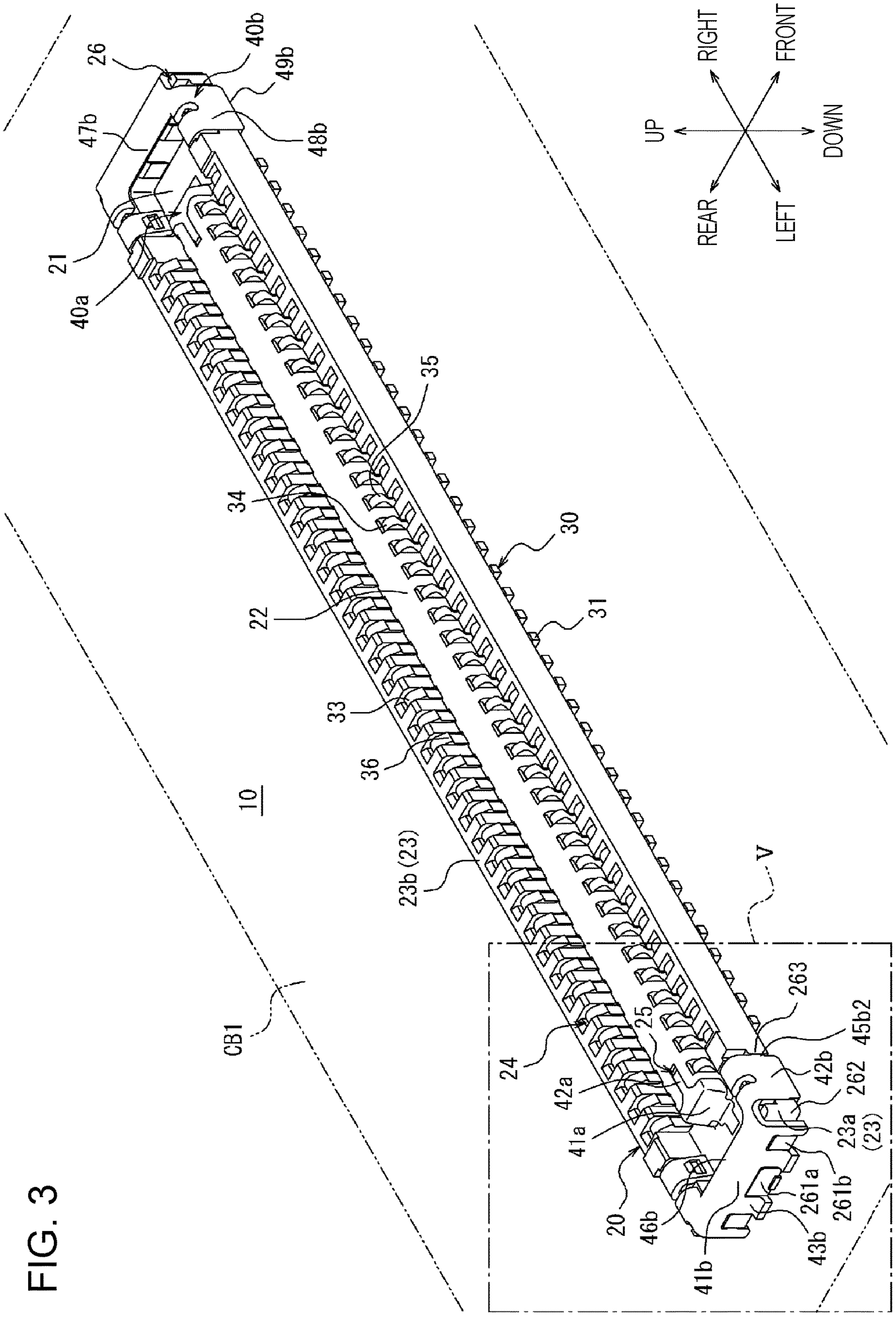
FIG. 3 is a perspective view, as viewed from above, illustrating the exterior of the connector of FIG. 1.

FIG. 3 is a perspective view, as viewed from above, illustrating the exterior of the connector 10 of FIG. 1. For example, the connector 10 can be obtained in the following manner: the first insulator 20 is formed integrally with the first metal fittings 40*a* using insert molding, and the first contacts 30 and the second metal fittings 40*b* are press-fitted into the first insulator 20.

Figure 4:
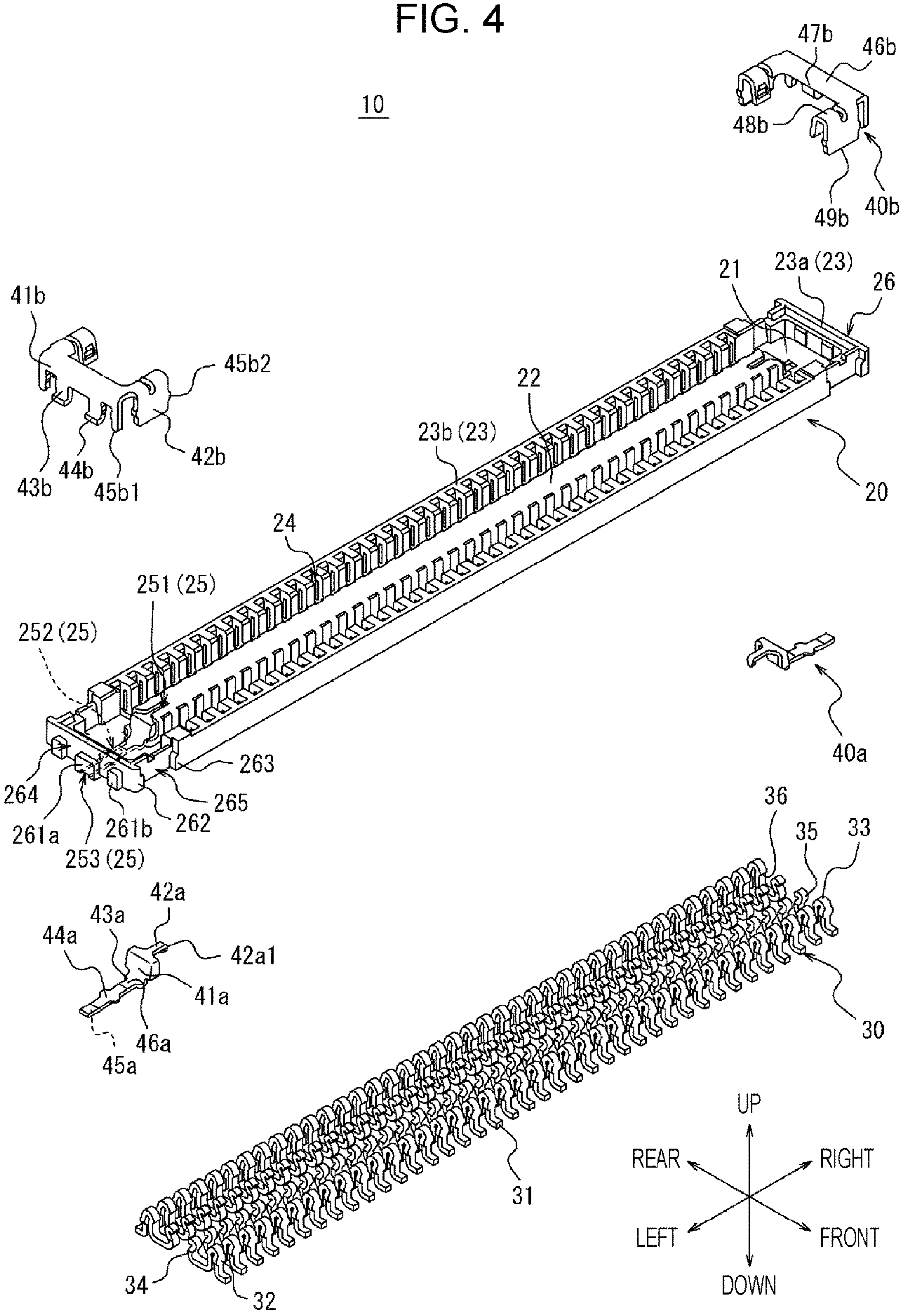
FIG. 4 is an exploded perspective view, as viewed from above, illustrating the exterior of the connector of FIG. 3.

FIG. 4 is an exploded perspective view, as viewed from above, illustrating the exterior of the connector 10 of FIG. 3. Although the first insulator 20 and the first metal fittings 40*a* are formed integrally by insert molding, the first metal fittings 40*a* and the first insulator 20 are illustrated separately in FIG. 4 to facilitate easy understanding.

The first insulator 20 of the connector 10 is made of a synthetic resin having insulating and heat-resisting properties. The first insulator 20 is shaped like a plate elongated in the right-left direction. The first insulator 20 includes a bottom plate 21 that constitutes the bottom part of the first insulator 20. The first insulator 20 includes an engagement projection 22 that projects upward from a central region of the bottom plate 21, the central region being located in the front-rear and right-left directions. The first insulator 20 includes peripheral walls 23 that surround the engagement projection 22. The peripheral walls 23 surround the engagement projection 22 in four directions in the front-rear and right-left directions. The peripheral walls 23 include transverse walls 23*a* and longitudinal walls 23*b*. The transverse walls 23*a* extend in the front-rear direction. The longitudinal walls 23*b* extend in the right-left direction.

The first insulator 20 includes first-contact mounting grooves 24. Each first-contact mounting groove 24 is formed continuously in the front-rear direction along an inside surface of a longitudinal wall 23*b*, the bottom plate 21, and an inside surface of the engagement projection 22. A first contact 30 is mounted in each first-contact mounting groove 24. Multiple first-contact mounting grooves 24 are formed, and the number of the first-contact mounting grooves 24 corresponds to the number of the first contacts 30. The first-contact mounting grooves 24 are arranged in the arrangement direction of the first contacts 30.

Figure 5:
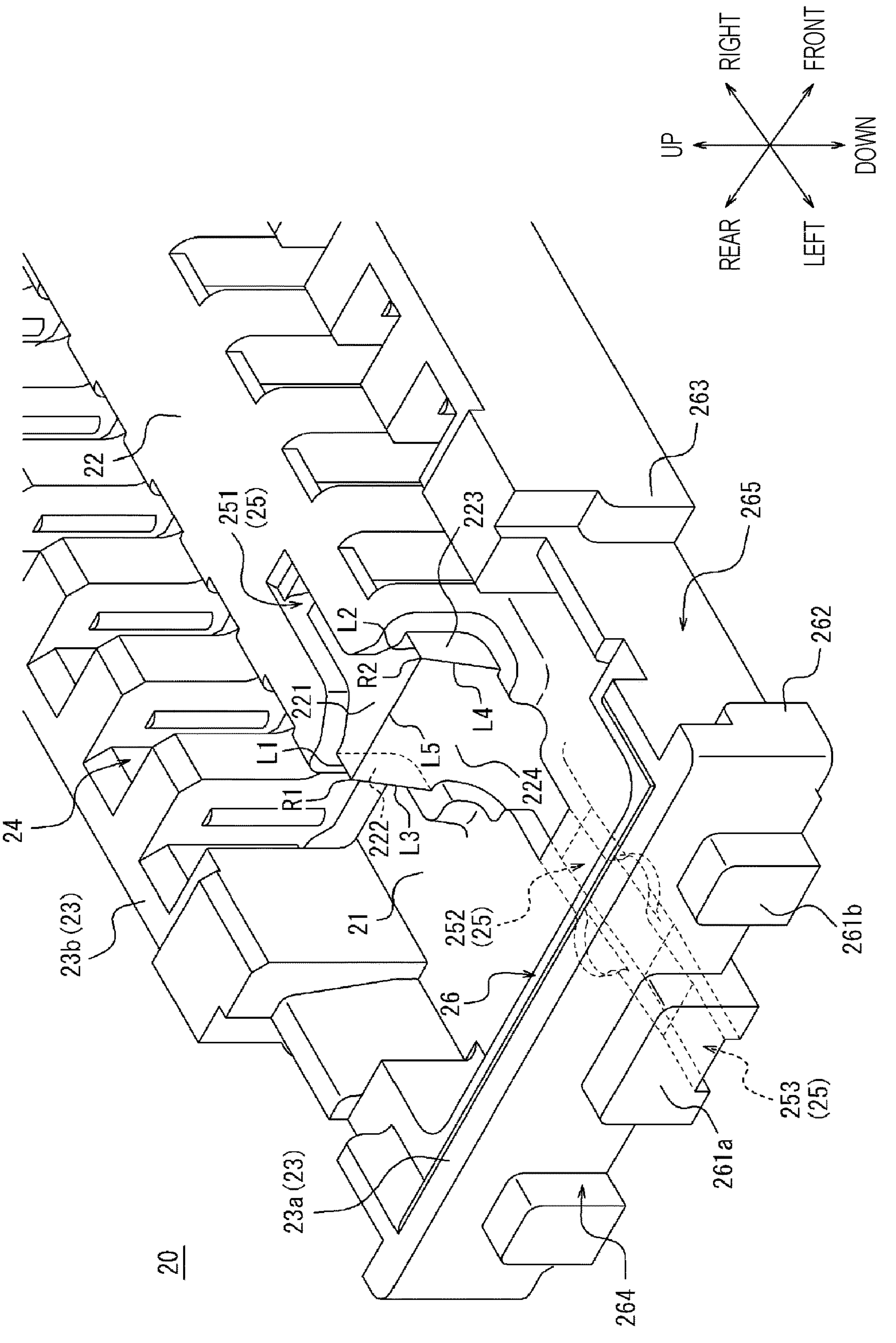
FIG. 5 is an enlarged view illustrating a region V surrounded by the dash-dot line in FIG. 3, in which a first insulator only is illustrated.

The first insulator 20 includes first-metal-fitting holding portions 25. Each first-metal-fitting holding portion 25 extends from one end of the engagement projection 22 in the right-left direction to a corresponding transverse wall 23*a* along the bottom plate 21. As illustrated in FIG. 5, which is described later again, the first-metal-fitting holding portion 25 includes a first cavity 251 recessed in each end portion of the engagement projection 22, the end portion being positioned in the right-left direction. The first-metal-fitting holding portion 25 includes a second cavity 252 formed so as to pierce through the bottom plate 21. The first-metal-fitting holding portion 25 includes a third cavity 253 recessed at the bottom surface of the transverse wall 23*a*. A first metal fitting 40*a* is attached to the first-metal-fitting holding portion 25. The first-metal-fitting holding portion 25 extends in the right-left direction so as to connect the engagement projection 22 and the transverse wall 23*a* together.

The first insulator 20 includes second-metal-fitting mounting portions 26. Each second-metal-fitting mounting portion 26 is formed continuously along the transverse wall 23*a* and also along corresponding end portions of the longitudinal walls 23*b*, the end portions being positioned in the right-left direction. A second metal fitting 40*b* is attached to the second-metal-fitting mounting portion 26.

Each second-metal-fitting mounting portion 26 includes a first wall portion 261*a*. The first wall portion 261*a* is formed at a lower position in a central region of each transverse wall 23*a* in the front-rear direction, and the first wall portion 261*a* protrudes outward in the right-left direction. The third cavity 253 of the first-metal-fitting holding portion 25 is recessed at the bottom surface of the first wall portion 261*a*. The second-metal-fitting mounting portion 26 includes second wall portions 261*b*. The second wall portions 261*b* are formed at lower positions on each transverse wall 23*a* so as to be spaced from each other in the front-rear direction, and the second wall portions 261*b* protrude outward in the right-left direction. The second-metal-fitting mounting portion 26 includes third wall portions 262. The third wall portions 262 are formed at respective corner portions of the first insulator 20. More specifically, each third wall portion 262 is formed at a lower position at each corner of the first insulator 20 so as to extend from the transverse wall 23*a* to the longitudinal wall 23*b*. The second-metal-fitting mounting portion 26 includes fourth wall portions 263. Each fourth wall portion 263 is formed at a longitudinal wall 23*b* so as to be spaced from the corresponding third wall portion 262 in the right-left direction. The first wall portion 261*a*, the second wall portions 261*b*, the third wall portions 262, and the fourth wall portions 263 define a rectangular outermost shape of the first insulator 20, the rectangular outermost shape extending in the front-rear and right-left directions.

Each second-metal-fitting mounting portion 26 also includes a first mounting groove 264. The first mounting groove 264 is formed in regions between the first wall portion 261*a* and respective second wall portions 261*b* and also in regions outside respective second wall portions 261*b* in the front-rear direction. The second-metal-fitting mounting portion 26 also includes second mounting grooves 265 each of which is formed between each the third wall portion 262 and the corresponding fourth wall portion 263.

FIG. 5 is an enlarged view illustrating a region V surrounded by the dash-dot-dot line in FIG. 3, in which the first insulator 20 only is illustrated. Referring to FIG. 5, a portion of the engagement projection 22, which is located at the first cavity 251 of the first-metal-fitting holding portion 25 of the first insulator 20, is described in detail.

As illustrated in FIG. 5, the engagement projection 22 of the first insulator 20 has a first face 221. The first face 221 is an end surface facing the engagement side and positioned in the first cavity 251 of each first-metal-fitting holding portion 25. The engagement projection 22 has a second face 222 that extends toward a side opposite to the engagement side from the rear edge of the first face 221, the rear edge extending in the longitudinal direction of the connector 10. The engagement projection 22 has a third face 223 that extends toward the side opposite to the engagement side from the front edge of the first face 221, the front edge extending in the longitudinal direction of the connector 10. The engagement projection 22 has a fourth face 224 that extends toward the side opposite to the engagement side from the edge of the first face 221, the edge being positioned at the end of the engagement projection 22 in the right-left direction and extending in the transverse direction of the connector 10. The first face 221, the second face 222, the third face 223, and the fourth face 224 are flat surfaces.

The engagement projection 22 includes a first intersection portion R1 at which the first face 221, the second face 222, and the fourth face 224 intersect each other. The first intersection portion R1 is positioned at the rear corner of the engagement projection 22. The first intersection portion R1 includes the intersection of three planes, in other words, the first face 221, the second face 222, and the fourth face 224, and also includes the vicinity of the intersection extending in the first face 221, the second face 222, and the fourth face 224.

The engagement projection 22 includes a second intersection portion R2 at which the first face 221, the third face 223, and the fourth face 224 intersect each other. The second intersection portion R2 is positioned at the front corner of the engagement projection 22. The second intersection portion R2 includes the intersection of three planes, in other words, the first face 221, the third face 223, and the fourth face 224, and also includes the vicinity of the intersection extending in the first face 221, the third face 223, and the fourth face 224.

The engagement projection 22 has a first intersection line L1 between the first face 221 and the second face 222. The engagement projection 22 has a second intersection line L2 between the first face 221 and the third face 223. The engagement projection 22 has a third intersection line L3 between the second face 222 and the fourth face 224. The engagement projection 22 has a fourth intersection line L4 between the third face 223 and the fourth face 224. The engagement projection 22 has a fifth intersection line L5 between the first face 221 and the fourth face 224. The first intersection line L1, the second intersection line L2, the third intersection line L3, the fourth intersection line L4, and the fifth intersection line L5 are straight lines.

Each first contact 30 is made, for example, of a thin plate that has a spring-like elasticity and is made of a copper alloy, such as phosphor bronze, beryllium copper, or copper-titanium alloy, or of a Corson system copper alloy. The first contact 30 is formed of the thin plate using progressive metal forming (stamping) so as to have a shape illustrated in FIG. 4. The surface of the first contact 30 is plated with nickel to form a foundation layer and further plated with gold or tin thereover.

The first contact 30 includes a mount portion 31 that is an L-shaped protrusion protruding outward in the front-rear direction. The first contact 30 also includes a locking portion 32 that extends upward from the top end of the mount portion 31. The locking portion 32 is formed so as to be wider in the right-left direction than the mount portion 31. The first contact 30 includes a curved portion 33 shaped like the letter U. The curved portion 33 protrudes upward from the locking portion 32.

The first contact 30 includes an elastic contact arm 34 that adjoins the curved portion 33 and shaped like the letter S. The first contact 30 includes an elastic contact point 35. The clastic contact point 35 is formed at the bent end portion of the clastic contact arm 34. The clastic contact point 35 faces outward in the front-rear direction. The first contact 30 also includes a contact point 36 formed at the curved portion 33. The contact point 36 protrudes so as to oppose the clastic contact point 35 in the front-rear direction.

Each first metal fitting 40*a* is formed of a thin plate of an arbitrary metal so as to have a shape illustrated in FIG. 4 using progressive metal forming (stamping). The first metal fitting 40*a* has a crank-like shape. More specifically, the first metal fitting 40*a* includes a hook portion 42*a*, a first base portion 41*a*, and a second base portion 43*a* (to be described later), and these portions integrally form the crank-like shape. The first base portion 41*a* and the second base portion 43*a* integrally form the crank-like shape. The first metal fitting 40*a* is formed in a manufacturing step including drawing so that the surfaces of a first base portion 41*a* that face upward or in the front-rear or right-left direction can be connected together seamlessly. The method of forming the first metal fitting 40*a* is not limited to this but may include a step of punching and bending in the thickness direction or the like without including the drawing.

The first metal fitting 40*a* includes the first base portion 41*a*. The first base portion 41*a* extends upward while inclining inward in the right-left direction. The first base portion 41*a* is subsequently bent at the top end thereof and extend further toward one side in the right-left direction. The first base portion 41*a* connects the second base portion 43*a* and the hook portion 42*a* (to be described later) together.

The first metal fitting 40*a* includes the hook portion 42*a*. The first base portion 41*a* has the portion that extends toward the above-described one side in the right-left direction, and the hook portion 42*a* extends further toward the one side from the portion of the first base portion 41*a*. The hook portion 42*a* is shaped like the letter L. The hook portion 42*a* has a tip end 42*a*1, and the tip end 42*a*1 is, for example, bent downward from an end of the hook portion 42*a*, the end facing the one side. The width of the hook portion 42*a* in the front-rear direction is smaller than the width of any other portion of the first metal fitting 40*a*. In other words, the width of the hook portion 42*a* in the front-rear direction is smaller, for example, than the width of the first base portion 41*a* that adjoins the hook portion 42*a*. The width of the hook portion 42*a* in the front-rear direction is smaller, for example, than the width of the second base portion 43*a* or the width of a wide portion 44*a* (to be described later).

The first metal fitting 40*a* includes the second base portion 43*a* that extends straight toward the other side in the right-left direction from the bottom end of the first base portion 41*a*. In the front-rear direction, the width of the second base portion 43*a* is smaller than the width of the first base portion 41*a* that adjoins the second base portion 43*a*.

Figure 6:
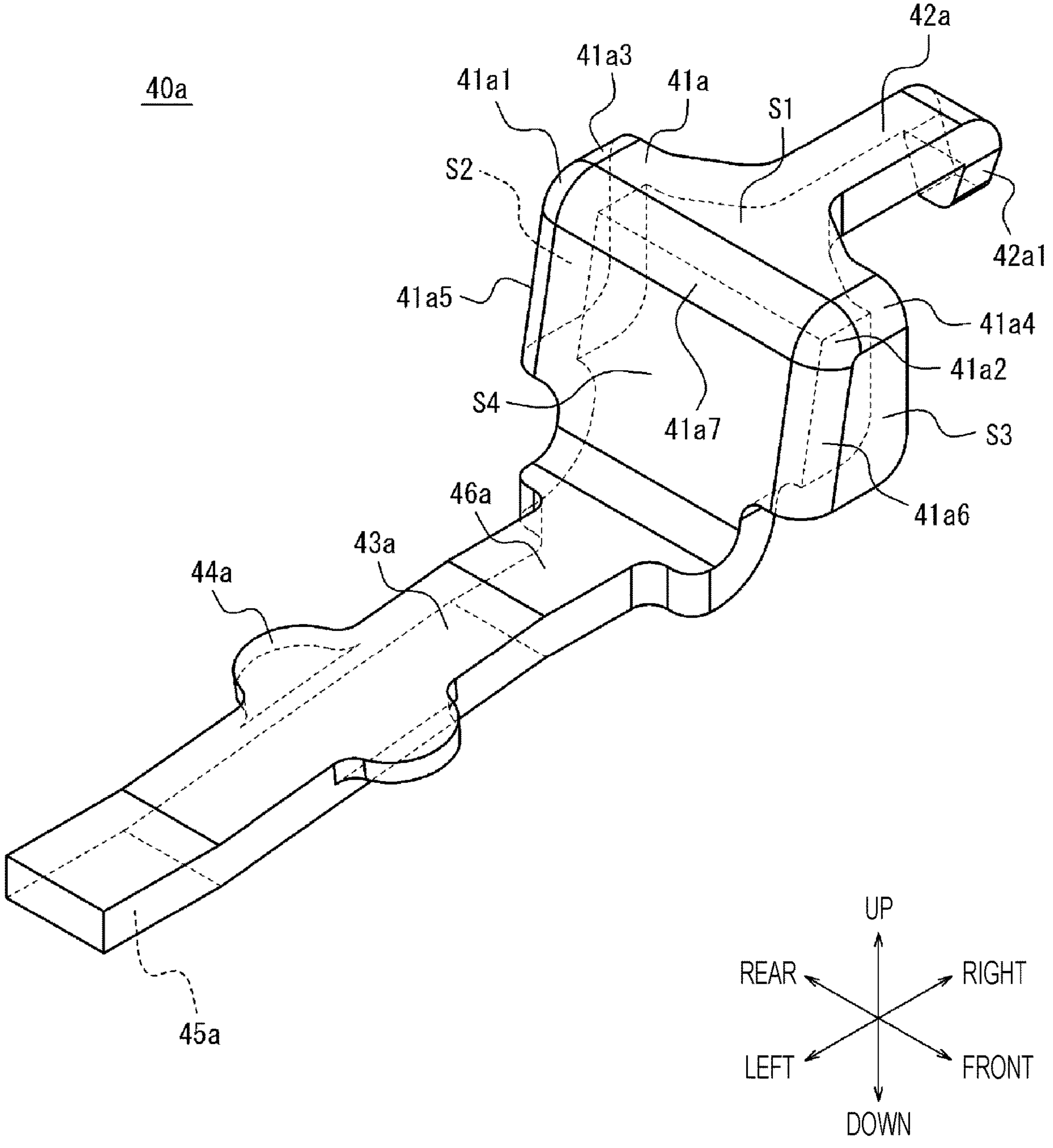
FIG. 6 is an enlarged view illustrating the region V surrounded by the dash-dot line in FIG. 3, in which a first metal fitting only is illustrated.

The first metal fitting 40*a* includes a wide portion 44*a* in the second base portion 43*a*. The wide portion 44*a* is shaped so as to be wider than any other portion of the second base portion 43*a* in the front-rear direction. The wide portion 44*a* has symmetrically shaped protrusions that protrude oppositely in the front-rear direction in a central region of the second base portion 43*a* in the right-left direction. As illustrated in FIG. 6 (to be described later), the first metal fitting 40*a* includes a mount portion 45*a*. The mount portion 45*a* includes a bottom surface of a longitudinal end portion of the second base portion 43*a*, the bottom surface facing the circuit substrate CB1. The mount portion 45*a*, however, is not limited to this. In addition to the bottom surface of the second base portion 43*a*, the mount portion 45*a* may further include the side surfaces of the second base portion 43*a* that are exposed from the bottom plate 21 of the first insulator 20.

As illustrated in FIG. 4, the first metal fitting 40*a* includes a contact portion 46*a*, which is part of the second base portion 43*a*. The contact portion 46*a* adjoins the first base portion 41*a* at the end of the first base portion 41*a* positioned in the right-left direction. The second base portion 43*a* is shaped such that the central portion including the wide portion 44*a* inclines upward and extends inward in the right-left direction from the mount portion 45*a* to the contact portion 46*a* and the contact portion 46*a* further extends horizontally again.

FIG. 6 is an enlarged view illustrating the region V surrounded by the dash-dot-dot line in FIG. 3, in which the first metal fitting 40*a* only is illustrated. Referring to FIG. 6, the structure of the first base portion 41*a* of the first metal fitting 40*a* is described in detail in relation to the portions of the engagement projection 22 in FIG. 5.

The first metal fitting 40*a* includes a first end portion 41*a*1. The first end portion 41*a*1 is disposed at the first intersection portion R1 of the engagement projection 22, at which the first face 221, the second face 222, and the fourth face 224 intersect, so as to cover part of the first face 221, part of the second face 222, and part of the fourth face 224. The first end portion 41*a*1 is a rear corner portion of the first base portion 41*a* and has a round shape. The first end portion 41*a*1 is an upper-rear corner portion of the first metal fitting 40*a*.

The first metal fitting 40*a* includes a second end portion 41*a*2. The second end portion 41*a*2 is disposed at the second intersection portion R2 of the engagement projection 22, at which the first face 221, the third face 223, and the fourth face 224 intersect, so as to cover part of the first face 221, part of the third face 223, and part of the fourth face 224. The second end portion 41*a*2 is a front corner portion of the first base portion 41*a* and has a round shape. The second end portion 41*a*2 is an upper-front corner portion of the first metal fitting 40*a*.

The first metal fitting 40*a* includes a first projected portion 41*a*3. The first projected portion 41*a*3 is a boundary region that extends in the longitudinal direction from the first end portion 41*a*1 along the first intersection line L1 between the first face 221 and the second face 222. The first projected portion 41*a*3 is formed so as to have a cross section shaped like the letter Las viewed in the right-left direction. The first projected portion 41*a*3 is a bent portion formed from the top surface to the rear surface of the first base portion 41*a*.

The first metal fitting 40*a* includes a second projected portion 41*a*4. The second projected portion 41*a*4 is a boundary region that extends in the longitudinal direction from the second end portion 41*a*2 along the second intersection line L2 between the first face 221 and the third face 223. The second projected portion 41*a*4 is formed so as to have a cross section shaped like the letter L as viewed in the right-left direction. The second projected portion 41*a*4 is a bent portion formed from the top surface to the front surface of the first base portion 41*a*.

The first metal fitting 40*a* includes a third projected portion 41*a*5. The third projected portion 41*a*5 is a boundary region that extends from the first end portion 41*a*1 toward the side opposite to the engagement side along the third intersection line L3 between the second face 222 and the fourth face 224. The third projected portion 41*a*5 is formed so as to have a cross section shaped like the letter L as viewed from above. The third projected portion 41*a*5 is a bent portion formed from the side surface facing in the right-left direction to the rear surface of the first base portion 41*a*.

The first metal fitting 40*a* includes a fourth projected portion 41*a*6. The fourth projected portion 41*a*6 is a boundary region that extends from the second end portion 41*a*2 toward the side opposite to the engagement side along the fourth intersection line L4 between the third face 223 and the fourth face 224. The fourth projected portion 41*a*6 is formed so as to have a cross section shaped like the letter L as viewed from above. The fourth projected portion 41*a*6 is a bent portion formed from the side surface facing in the right-left direction to the front surface of the first base portion 41*a*.

The first metal fitting 40*a* includes a fifth projected portion 41*a*7. The fifth projected portion 41*a*7 is a boundary region that extends between the first end portion 41*a*1 and the second end portion 41*a*2 along the fifth intersection line L5 between the first face 221 and the fourth face 224. The fifth projected portion 41*a*7 is formed so as to have a cross section shaped like the letter Las viewed in the front-rear direction. The fifth projected portion 41*a*7 is a bent portion formed from the top surface of the first base portion 41*a* to the side surface facing in the right-left direction.

The first metal fitting 40*a* has a first flat surface S1 disposed along the first face 221, a second flat surface S2 disposed along the second face 222, a third flat surface S3 disposed along the third face 223, and a fourth flat surface S4 disposed along the fourth face 224.

The first flat surface S1 is the top surface of the first metal fitting 40*a*. The first flat surface S1 adjoins the front edge of the first projected portion 41*a*3, the edge of the fifth projected portion 41*a*7 positioned in the right-left direction, and the rear edge of the second projected portion 41*a*4. The second flat surface S2 is the rear surface of the first metal fitting 40*a*. The second flat surface S2 adjoins the lower edge of the first projected portion 41*a*3 and the edge of the third projected portion 41*a*5 positioned in the right-left direction.

The third flat surface S3 is the front surface of the first metal fitting 40*a*. The third flat surface S3 adjoins the lower edge of the second projected portion 41*a*4 and the edge of the fourth projected portion 41*a*6 positioned in the right-left direction. The fourth flat surface S4 is the side surface of the first metal fitting 40*a* facing in the right-left direction. The fourth flat surface S4 adjoins the front edge of the third projected portion 41*a*5, the lower edge of the fifth projected portion 41*a*7, and the rear edge of the fourth projected portion 41*a*6.

In the longitudinal end portion of the engagement projection 22, the first metal fitting 40*a* seamlessly covers the first face 221, the second face 222, the third face 223, the fourth face 224, and all the intersection lines therebetween, with a surface of the first metal fitting 40*a*, the surface orthogonally intersecting the thickness direction of the first metal fitting 40*a*. The first base portion 41*a* of the first metal fitting 40*a* is shaped such that the first flat surface S1, the second flat surface S2, the third flat surface S3, and the fourth flat surface S4 are connected together seamlessly and smoothly by the end portions and the projected portions. The first metal fitting 40*a* having such a shape can be formed by drawing.

Each second metal fitting 40*b* is formed of a thin plate of an arbitrary metal so as to have a shape illustrated in FIG. 4 using progressive metal forming (stamping). The method of manufacturing the second metal fitting 40*b* includes a step of punching out a piece and a step of bending the punched piece in the thickness direction.

The second metal fitting 40*b* includes a first base portion 41*b* that extends in the front-rear direction. The second metal fitting 40*b* also includes second base portions 42*b* that protrude toward the above-described one side in the right-left direction from respective ends of the first base portion 41*b* in the front-rear direction. The second metal fitting 40*b* includes protruding portions 43*b* that protrude straight downward from respective front and rear portions of the first base portion 41*b*. A lower part of each protruding portion 43*b* is projected outward in the right-left direction. A pair of the protruding portions 43*b*, which are spaced in the front-rear direction, have respective edges that oppose each other. These edges of the protruding portions 43*b* and a lower edge of the first base portion 41*b* form a recess. The second metal fitting 40*b* includes first mount portions 44*b* positioned at the bottom ends of respective protruding portions 43*b*. The second metal fitting 40*b* includes locking portions 45*b*1. Each locking portion 45*b*1 includes a wider part of the protruding portion 43*b*, the part being wider in the front-rear direction than any other parts. Each locking portion 45*b*1 also includes another protruding portion that protrudes straight downward from the first base portion 41*b* at a position outside the protruding portion 43*b* in the front-rear direction.

The second metal fitting 40*b* includes a curved portion 46*b*. The curved portion 46*b* is shaped like the letter U and protrudes inward in the second metal fitting 40*b*. The curved portion 46*b* adjoins the first base portion 41*b* substantially over the entire length of the first base portion 41*b*. The curved portion 46*b* also adjoins a part of each second base portion 42*b*, the part positioned closer to the other side in the right-left direction. The second metal fitting 40*b* includes an inside edge 47*b* adjoining an inner part of the curved portion 46*b*. The inside edge 47*b* is formed seamlessly in the right-left and front-rear directions.

The second metal fitting 40*b* includes contact arms 48*b* each shaped like the letter U. Each contact arm 48*b* adjoins a portion of each second base portion 42*b*, the portion positioned closer to the one side in the right-left direction. Each contact arm 48*b* has a portion extending inward in the front-rear direction and having a spring-like elasticity. The second metal fitting 40*b* includes second mount portions 49*b* positioned at bottom ends of outside portions of respective second base portions 42*b*, the outside portions facing outward in the front-rear direction. Each second mount portion 49*b* extends substantially over the entire length of the second base portion 42*b* in the right-left direction. The second metal fitting 40*b* includes locking portions 45*b*2 that adjoin upper parts of respective second mount portions 49*b*. Each locking portion 45*b*2 is formed in the second base portion 42*b* so as to have a width greater than that of any other part in the right-left direction. The locking portion 45*b*2 has symmetrically shaped protrusions protruding in the right-left direction from the second base portion 42*b*.

Figure 7:
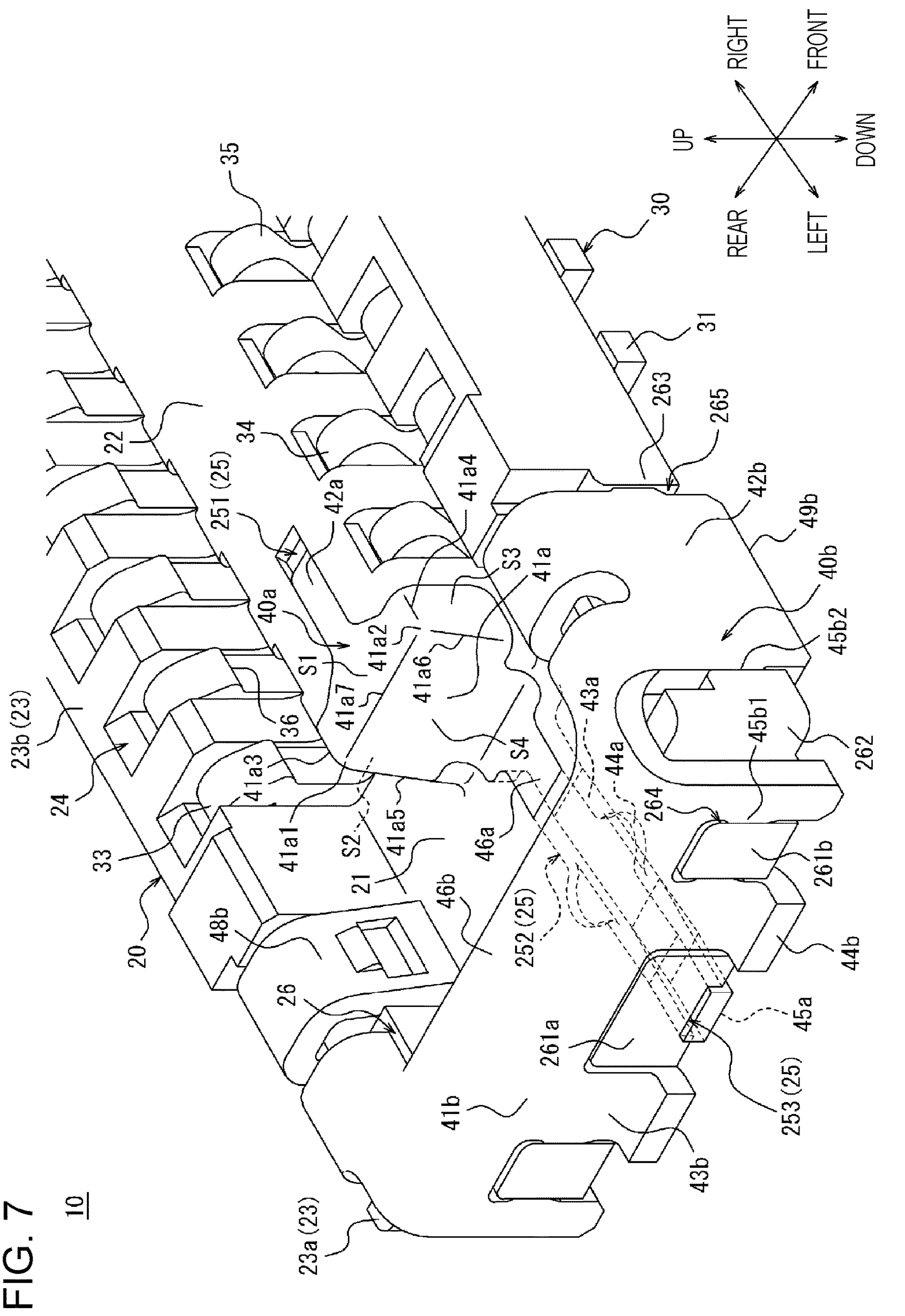
FIG. 7 is an enlarged view illustrating the region V surrounded by the dash-dot line in FIG. 3.
Figure 8:
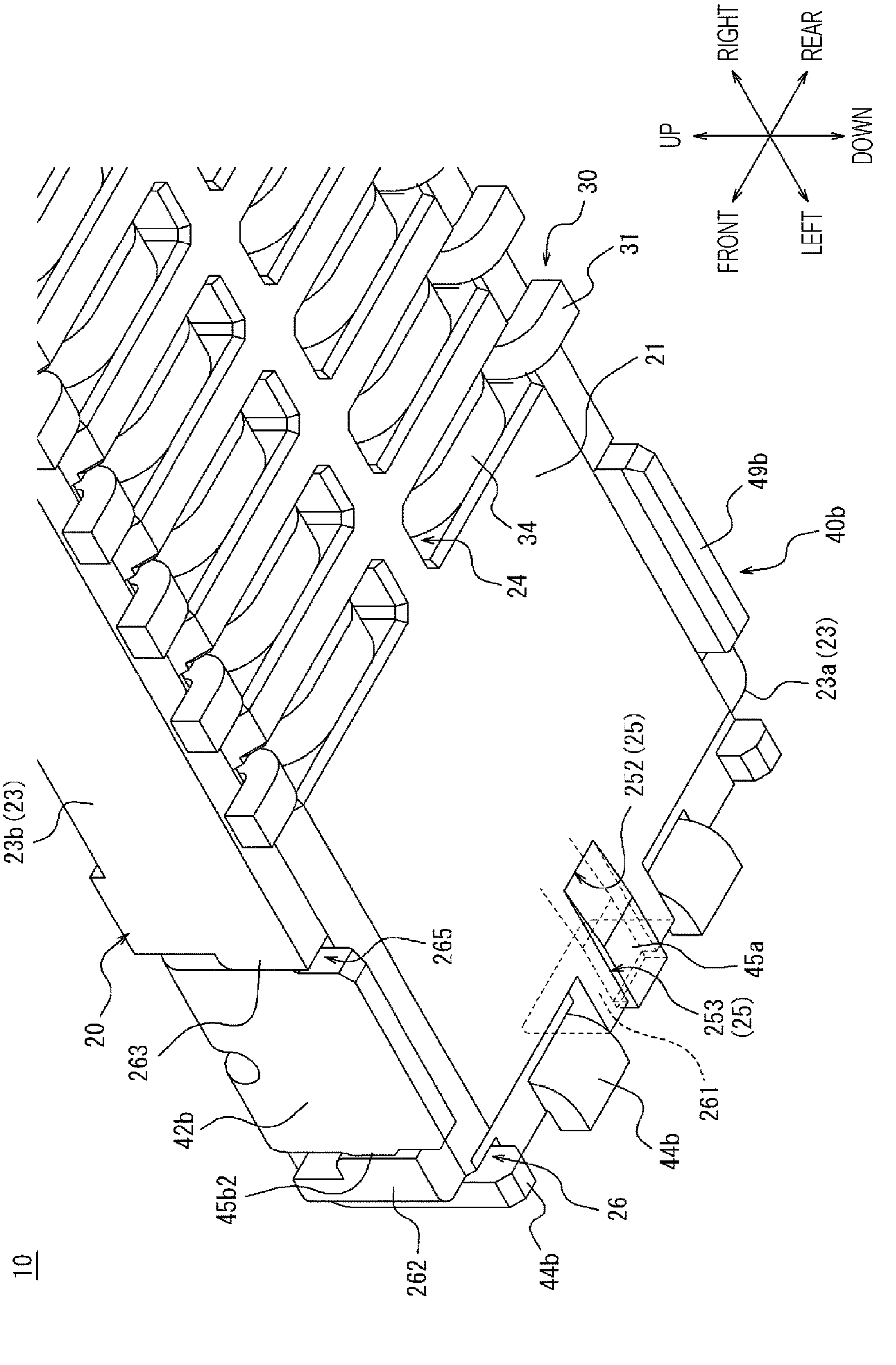
FIG. 8 is an enlarged view illustrating the connector of FIG. 7 as viewed from below.

FIG. 7 is an enlarged view illustrating the region V surrounded by the dash-dot-dot line in FIG. 3. FIG. 8 is an enlarged view illustrating the connector 10 of FIG. 7 as viewed from below.

Each first contact 30 is press-fitted into the first insulator 20 from below. In this state, the locking portion 32 of the first contact 30 is locked between inside surfaces of each first-contact mounting groove 24, the inside surfaces facing each other in the right-left direction. The first contact 30 is thereby held in the first-contact mounting groove 24.

When the first contact 30 is held in the corresponding first-contact mounting groove 24 of the first insulator 20, the clastic contact point 35 and the contact point 36 project from the first-contact mounting groove 24 into the space between the engagement projection 22 and the corresponding longitudinal wall 23*b*. The elastic contact arm 34 of the first contact 30 is elastically deformable in the front-rear direction inside the first-contact mounting groove 24. The tip end of each mount portion 31 is positioned so as to be substantially flush with the longitudinal wall 23*b* in the front-rear direction.

As illustrated in FIGS. 7 and 8, the first metal fitting 40*a* and the second metal fitting 40*b* are separate members. The first metal fitting 40*a* is spaced from the second metal fitting 40*b*. In the separated state, the first metal fitting 40*a* opposes the second metal fitting 40*b* in the right-left direction. The first metal fitting 40*a* and the second metal fitting 40*b* have different strengths. In other words, the strength of one of the first metal fitting 40*a* and the second metal fitting 40*b* is greater than the strength of the other. For example, the strength of the first metal fitting 40*a* can be greater than that of the second metal fitting 40*b*. For example, the strength of the material of the first metal fitting 40*a* can be greater than that of the material of the second metal fitting 40*b*. For example, the term "strength" as used herein includes tensile strength.

The first metal fitting 40*a* and the second metal fitting 40*b* may be made of different materials. For example, the material of the first metal fitting 40*a* can be stainless steel, and the material of the second metal fitting 40*b* can be phosphor bronze. The materials are not limited to the above. The material of the first metal fitting 40*a* and the material of the second metal fitting 40*b* may be selected arbitrarily from a group of material candidates so as to satisfy the condition that the strength of the first metal fitting 40*a* is greater than the strength of the second metal fitting 40*b*. The term "group of material candidates" include, for example, stainless steel, phosphor bronze, iron, Corson copper, copper titanium, beryllium copper, and aluminum.

The first metal fitting 40*a* can be made of the same type of material as that of the second metal fitting 40*b* insofar as the strength of the first metal fitting 40*a* is greater than the strength of the second metal fitting 40*b*. Even if the first metal fitting 40*a* and the second metal fitting 40*b* are made of the same type of alloy, such as phosphor bronze, the strength of the first metal fitting 40*a* can be made greater than that of the second metal fitting 40*b* if, for example, the number, type, or quality of the alloy is different. For example, even if the first metal fitting 40*a* and the second metal fitting 40*b* are made of the same type of material, such as phosphor bronze, the thickness of the first metal fitting 40*a* can be made greater than that of the second metal fitting 40*b*, which increases the strength of the first metal fitting 40*a* relative to that of the second metal fitting 40*b* (to be described later).

For example, the strength of the first contact 30 can be substantially the same as that of the second metal fitting 40*b*. The strength of the first metal fitting 40*a* can be greater than those of the second metal fitting 40*b* and the first contact 30. The materials of the first metal fitting 40*a*, the second metal fitting 40*b*, and the first contact 30 may be selected arbitrarily from the group of material candidates so as to satisfy the above strength relations among the first metal fitting 40*a*, the second metal fitting 40*b*, and the first contact 30.

The first metal fittings 40*a* are attached to respective ends of the engagement projection 22, the ends being positioned oppositely in the longitudinal direction of the connector 10. Each first metal fitting 40*a* extends in the longitudinal direction of the connector 10 from the engagement projection 22 to the corresponding transverse wall 23*a* to which a second metal fitting 40*b* is attached.

For example, each first metal fitting 40*a* is formed integrally in the corresponding first-metal-fitting holding portion 25 of the first insulator 20 using insert molding. Here, the first base portion 41*a* is formed integrally in an end portion of the engagement projection 22, the end portion being positioned in the right-left direction, so as to extend from the top surface to the side surfaces of the end portion. For example, the first base portion 41*a* is formed integrally in the first cavity 251 of the first-metal-fitting holding portion 25. The first base portion 41*a* covers each end portion of the engagement projection 22 entirely from outside, each end portion being positioned in the right-left direction.

More specifically, the first end portion 41*a*1 covers the first intersection portion R1. The second end portion 41*a*2 covers the second intersection portion R2. The first projected portion 41*a*3 covers the first intersection line L1 and the boundary region of the first intersection line L1 in the first face 221 and the second face 222. The second projected portion 41*a*4 covers the second intersection line L2 and the boundary region of the second intersection line L2 in the first face 221 and the third face 223. The third projected portion 41*a*5 covers the third intersection line L3 and the boundary region of the third intersection line L3 in the second face 222 and the fourth face 224. The fourth projected portion 41*a*6 covers the fourth intersection line L4 and the boundary region of the fourth intersection line L4 in the third face 223 and the fourth face 224. The fifth projected portion 41*a*7 covers the fifth intersection line L5 and the boundary region of the fifth intersection line L5 in the first face 221 and the fourth face 224. The first flat surface S1, the second flat surface S2, the third flat surface S3, and the fourth flat surface S4 cover the first face 221, the second face 222, the third face 223, and the fourth face 224, respectively.

The first flat surface S1 of the first base portion 41*a* is flush with the top surface of the engagement projection 22. The second flat surface S2 and the third flat surface S3 of the first base portion 41*a* are flush with respective side surfaces of the engagement projection 22. The first flat surface S1 of the first base portion 41*a* is not limited to this. The first flat surface S1 of the first base portion 41*a* does not need to be flush with the top surface of the engagement projection 22. For example, the first flat surface S1 of the first base portion 41*a* may be positioned below the top surface of the engagement projection 22. The second flat surface S2 and the third flat surface S3 of the first base portion 41*a* do not need to be flush with respective side surfaces of the engagement projection 22. For example, the second flat surface S2 and the third flat surface S3 of the first base portion 41*a* may be positioned further inside from the corresponding side surfaces of the engagement projection 22 in the right-left direction.

The hook portion 42*a* is formed integrally in the engagement projection 22 at the top surface thereof in such a manner that the tip end 42*a*1 of the hook portion 42*a* is embedded in the engagement projection 22. The top surface of the hook portion 42*a* is exposed from the first insulator 20. For example, the top surface of the hook portion 42*a* is flush with the top surface of the engagement projection 22. The top surface of the hook portion 42*a* is not limited to this but may be positioned below the top surface of the engagement projection 22.

The second base portion 43*a* is formed integrally in the bottom plate 21 and in the transverse wall 23*a*. For example, part of the second base portion 43*a* excluding an end portion thereof in the right-left direction is formed integrally in the second cavity 252 of the first-metal-fitting holding portion 25. In this state, the contact portion 46*a* of the second base portion 43*a* is exposed upward from the bottom plate 21. The end portion of the second base portion 43*a* including the mount portion 45*a* is formed integrally in the third cavity 253 of the first-metal-fitting holding portion 25. In this state, the end portion of the second base portion 43*a* is exposed outward in the right-left direction from the first wall portion 261*a* of the transverse wall 23*a*.

When the first metal fitting 40*a* and the first insulator 20 are formed integrally using insert molding, the wide portion 44*a* is embedded in the bottom plate 21. The second base portion 43*a* extends in the longitudinal direction of the connector 10. The second base portion 43*a* extends from the engagement projection 22 to the transverse wall 23*a* to which the second metal fitting 40*b* is attached. The bottom surface of the end portion of the second base portion 43*a*, the end portion positioned in the right-left direction and including the mount portion 45*a*, is exposed from the first insulator 20. For example, the bottom surface of the second base portion 43*a* is positioned below the bottom surface of the bottom plate 21.

The mount portion 45*a* of the first metal fitting 40*a* to be attached to the circuit substrate CB1 includes the bottom surface of the second base portion 43*a* that faces the circuit substrate CB1. For example, the mount portion 45*a* has an area extending in the front-rear and right-left directions on the bottom surface of the second base portion 43*a*. The mount portion 45*a* is positioned directly below the transverse wall 23*a* in the right-left direction.

For example, each second metal fitting 40*b* is press-fitted into the first insulator 20 from above. Each second metal fitting 40*b* is attached to a corresponding one of the peripheral walls 23 in such a manner that the first wall portion 261*a* is held in the recess of the second metal fitting 40*b*, the recess being defined by the lower edge of the first base portion 41*b* and by the mutually opposing edges of respective protruding portions 43*b* that are spaced in the front-rear direction.

Here, each locking portion 45*b*1 of the second metal fitting 40*b* is locked at the corresponding second wall portion 261*b* of the second-metal-fitting mounting portion 26 at a position outside the transverse wall 23*a* in the right-left direction. A pair of the protruding portions 43*b* spaced in the front-rear direction and the locking portions 45*b*1 are fitted in the first mounting groove 264. Similarly, each locking portion 45*b*2 of the second metal fitting 40*b* is locked between the third wall portion 262 and the corresponding fourth wall portion 263 of the second-metal-fitting mounting portion 26 at a position outside the corresponding longitudinal wall 23*b* in the front-rear direction. The locking portion 45*b*2 is thereby fitted in a corresponding one of the second mounting grooves 265. Thus, the second metal fitting 40*b* is held by the second-metal-fitting mounting portion 26.

When the second metal fitting 40*b* is held by the second-metal-fitting mounting portion 26 of the first insulator 20, the second metal fitting 40*b* covers the entire transverse wall 23*a* and also covers part of the longitudinal walls 23*b* at ends in the right-left direction. In this state, the second metal fitting 40*b* surrounds the second base portion 43*a* of the first metal fitting 40*a* from outside in the front-rear and right-left directions. More specifically, the second base portions 42*b* of the second metal fitting 40*b* are disposed at both sides of the second base portion 43*a* of the first metal fitting 40*a* in the front-rear direction. The first base portion 41*b*, the protruding portions 43*b*, and the curved portion 46*b* of the second metal fitting 40*b* are disposed so as to superpose the end portion of the second base portion 43*a* of the first metal fitting 40*a* in the right-left direction. Each contact arm 48*b* of the second metal fitting 40*b* includes a portion being positioned inside in the front-rear direction and extending downward, and this portion is elastically deformable in the front-rear direction.

The first mount portions 44*b* of the second metal fitting 40*b* are disposed along the outside surface of the corresponding transverse wall 23*a*, the outside surface facing outward in the right-left direction. The first mount portions 44*b* protrude downward below the bottom end of the transverse wall 23*a*. The first mount portions 44*b* are positioned respectively at both sides of the second base portion 43*a* of the first metal fitting 40*a* in the transverse direction of the connector 10. A pair of the first mount portions 44*b* are positioned so as to straddle the second base portion 43*a* of the first metal fitting 40*a* in the front-rear direction. For example, the first mount portions 44*b* are disposed respectively at symmetrical positions in the front-rear direction with respect to the second base portion 43*a* of the first metal fitting 40*a*.

The second mount portions 49*b* of the second metal fitting 40*b* are disposed along respective outside surfaces of the longitudinal walls 23*b*, the outside surfaces facing outward in the front-rear direction. The second mount portions 49*b* protrude downward below the bottom ends of the longitudinal walls 23*b*. The second mount portions 49*b* are positioned respectively at both sides of the first metal fitting 40*a* in the transverse direction of the connector 10. A pair of the second mount portions 49*b* are positioned so as to straddle the second base portion 43*a* of the first metal fitting 40*a* in the front-rear direction. For example, the second mount portions 49*b* are disposed respectively at symmetrical positions in the front-rear direction with respect to the mount portion 45*a* of the second base portion 43*a*. In the right-left direction, the second mount portions 49*b* are disposed substantially at the same positions as the positions of the mount portion 45*a* and the wide portion 44*a* of the first metal fitting 40*a*.

In the connector 10 with the above-described structure, the mount portions 31 of respective first contacts 30 are soldered to patterned traces formed on the mount surface of the circuit substrate CB1. The mount portion 45*a* of each first metal fitting 40*a*, and the first mount portions 44*b* and the second mount portions 49*b* of each second metal fitting 40*b* are soldered to corresponding patterned traces formed on the mount surface. Thus, the mount portions are fixed to the circuit substrate CB1, and the connector 10 is thereby mounted onto the circuit substrate CB1. For example, electronic components other than the connector 10, such as a central processing unit (CPU), a controller, and a memory, are also mounted on the mount surface of the circuit substrate CB1.

Figure 9:
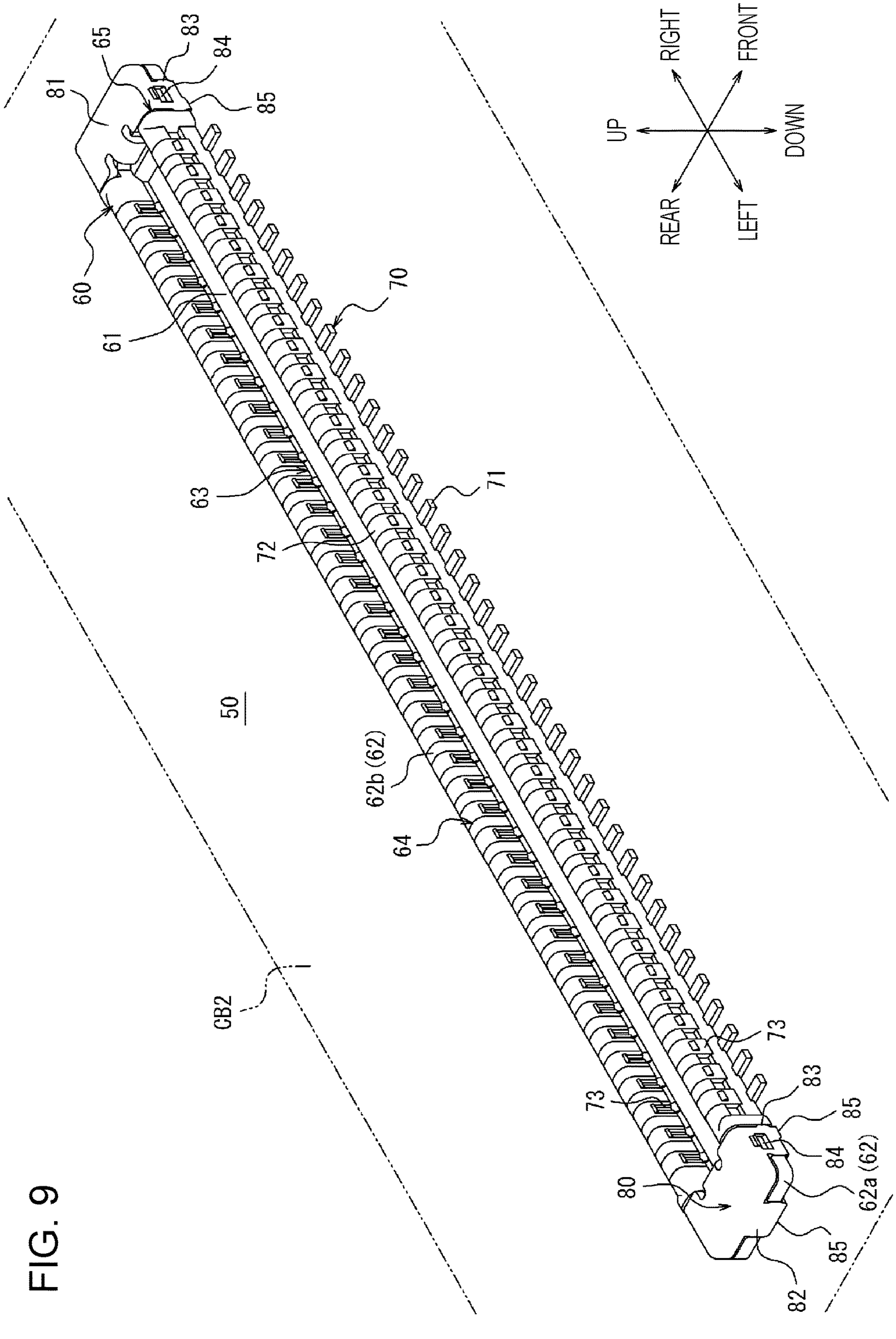
FIG. 9 is a perspective view, as viewed from above, illustrating the exterior of the connection object of FIG. 1.

The following describes the structure of the connection object 50 with reference mainly to FIG. 9.

FIG. 9 is a perspective view, as viewed from above, illustrating the exterior of the connection object 50 of FIG. 1. The connection object 50 can be obtained, for example, by forming the second insulator 60 integrally with the second contacts 70 using insert molding, and the metal fittings 80 are press-fitted into the second insulator 60 from above.

The second insulator 60 is a plate-like member elongated in the right-left direction. The second insulator 60 is made of a synthetic resin having insulating and heat-resisting properties using injection molding. The second insulator 60 includes a bottom plate 61 that constitutes the bottom part of the second insulator 60. The second insulator 60 includes annularly formed peripheral walls 62 that protrude upward from peripheral portions of the bottom plate 61, the peripheral portions extending in the front-rear and right-left directions. The peripheral walls 62 include transverse walls 62*a* and longitudinal walls 62*b*. The transverse walls 62*a* extend in the front-rear direction. The longitudinal walls 62*b* extend in the right-left direction. The second insulator 60 includes an engagement recess 63 surrounded by the peripheral walls 62 in the front-rear direction and in the right-left direction.

The second insulator 60 includes second-contact holding portions 64 each of which is formed continuously in each longitudinal wall 62*b* and in the bottom plate 61. The second contacts 70 are mounted in respective second-contact holding portions 64. The second insulator 60 includes metal-fitting holding portions 65 formed in respective transverse walls 62*a*. The metal fittings 80 are attached to respective metal-fitting holding portions 65.

Each second contact 70 having a shape as illustrated is formed, for example, of a thin plate made of a copper alloy, such as phosphor bronze, beryllium copper, or copper-titanium alloy, or of a Corson system copper alloy, using progressive metal forming (stamping). The surface of the second contact 70 is plated with nickel to form a foundation layer and further plated with gold or tin thereover.

The second contact 70 includes a mount portion 71 that is an L-shaped protrusion protruding outward in the front-rear direction. The second contact 70 includes a curved portion 72 that is shaped like the letter U. The curved portion 72 protrudes upward from the mount portion 71. The second contact 70 includes a pair of contact points 73 that are formed on respective side surfaces of the second contact 70, the side surfaces facing in the front-rear direction and being positioned at both sides of the curved portion 72.

Each second contact 70 is formed integrally in a corresponding second-contact holding portion 64 of the second insulator 60 using insert molding. A pair of the contact points 73 are disposed respectively at the front surface and at the rear surface of each longitudinal wall 62*b*. The mount portion 71 protrude outward through the bottom plate 61 and further extend outward in the front-rear direction. The tip end of the mount portion 71 is positioned outside the longitudinal wall 62*b* in the front-rear direction.

Each metal fitting 80 is formed of a thin plate of an arbitrary metal so as to have a shape as illustrated, using progressive metal forming (stamping). The method of manufacturing the metal fitting 80 includes a step of punching out a piece and a step of bending the punched piece in the thickness direction.

The metal fitting 80 includes a base portion 81 shaped tabularly. The metal fitting 80 includes first extension portions 82 that are shaped like the letter L. In the right-left direction, one of the first extension portions 82 extends outward from the outside edge of the base portion 81, and the other one extends inward from the inside edge of the base portion 81. The metal fitting 80 includes second extension portions 83 that extend outward from respective opposite ends of the base portion 81 in the front-rear direction. Each second extension portion 83 is shaped like the letter L. The metal fitting 80 includes contact points 84 that are formed at respective outside surfaces of the second extension portions 83, the outside surfaces facing in the front-rear direction. The metal fitting 80 includes mount portions 85 positioned at the bottom ends of the second extension portions 83 and the outward-facing first extension portion 82. Each metal fitting 80 is attached to the second insulator 60 with the first extension portions 82 and the second extension portions 83 being fitted in each metal-fitting holding portion 65 of the second insulator 60.

In the connection object 50 with the above-described structure, the mount portions 71 of respective second contacts 70 are soldered to patterned traces formed on the mount surface of the circuit substrate CB2. The mount portions 85 of the metal fittings 80 are soldered to patterned traces formed on the mount surface. Thus, the connection object 50 is mounted on the circuit substrate CB2. For example, electronic components other than the connection object 50, such as a communication module, are also mounted on the mount surface of the circuit substrate CB2.

With reference to FIGS. 10 to 12, the following description focuses on the structure of the connector module 1 in the engagement state in which the connector 10 and the connection object 50 are connected together and the first insulator 20 and the second insulator 60 engage each other. FIG. 10 is a cross-sectional view of the connector module 1 taken along line X-X in FIG. 1.

For example, the orientation of the connection object 50 illustrated in FIG. 9 is first reversed upside down. In this state, the connection object 50 is positioned so as to oppose the connector 10 while the connector 10 and the connection object 50 are substantially aligned with each other in the front-rear and right-left directions. The connection object 50 is subsequently moved downward. The connection object 50 and the connector 10 are thereby connected to each other, in other words, the connector module 1 is in the connection state. Here, the engagement projection 22 of the first insulator 20 engages the engagement recess 63 of the second insulator 60.

In the engagement state, the elastic contact point 35 of each first contact 30 comes into contact with a corresponding contact point 73 of each second contact 70, and the elastic contact arm 34 having spring-like elasticity is elastically deformed inward in the front-rear direction. In the engagement state, the contact point 36 of the first contact 30 comes into contact with the contact point 73 of the second contact 70. The first contact 30 comes into contact with the second contact 70 at two points in the front-rear direction, in other words, at a point between the clastic contact point 35 and one of the contact points 73 and at another point between the contact point 36 and the other contact point 73.

FIG. 11 is a cross-sectional view of the connector module 1 taken along line XI-XI in FIG. 1.

In the engagement state, the contact arms 48*b* of each second metal fitting 40*b* come into contact with the corresponding contact points 84 of each metal fitting 80. Here, the contact arms 48*b* having spring-like elasticity deform elastically outward in the front-rear direction. The second metal fitting 40*b* and the metal fitting 80 come into contact with each other at two points in the front-rear direction using the contact arms 48*b* and the contact points 84.

The top surface of the second base portion 43*a* of the first metal fitting 40*a* comes into contact with the base portion 81 of the metal fitting 80. More specifically, the contact portion 46*a* of the second base portion 43*a*, which is exposed upward from the second cavity 252 of the bottom plate 21, comes into contact with the base portion 81 of the metal fitting 80.

FIG. 12 is a cross-sectional view of the connector module 1 taken along line XII-XII in FIG. 1.

Each metal fitting 80 of the connection object 50 is positioned between the corresponding first metal fitting 40*a* and the corresponding second metal fitting 40*b* in the engagement state in which the connector 10 and the connection object 50 engage each other. The metal fitting 80 is positioned between the first metal fitting 40*a* and the second metal fitting 40*b* in the longitudinal direction of the connector 10. In the engagement state, the second base portion 43*a* of the first metal fitting 40*a* is disposed so as to be in contact with the base portion 81 of the metal fitting 80 in the up-down direction. More specifically, the contact portion 46*a* of the second base portion 43*a* and the base portion 81 are in contact with each other. In the engagement state, the inside edge 47*b* of the curved portion 46*b* of the second metal fitting 40*b* is disposed so as to oppose the outward-facing first extension portion 82 of the metal fitting 80 in the right-left direction.

Multiple first contacts 30 are arranged in a row in the arrangement direction, which is parallel to the longitudinal direction of the connector 10. In the arrangement direction, each first metal fitting 40*a* superposes a one first contact 30 positioned at each end of the row. For example, as illustrated in FIG. 7, the hook portion 42*a* of the first metal fitting 40*a* superposes the one first contact 30 positioned at the end in the arrangement direction. For example, a part of the hook portion 42*a*, the part extending in the right-left direction, comes to the position of the one first contact 30 in the right-left direction.

As illustrated in FIG. 12, the tip end 42*a*1 of the hook portion 42*a* of the first metal fitting 40*a* is positioned, in the arrangement direction, between the one first contact 30 and an adjacent first contact 30 disposed next to the one first contact 30. For example, another part of the hook portion 42*a*, another part extending in the right-left direction, is also positioned, together with the tip end 42*a*1 extending in the up-down direction, between the one first contact 30 and the adjacent first contact 30 positioned next to the one first contact 30 in the arrangement direction.

In FIG. 12, the thickness of each first metal fitting 40*a* is substantially equal to or smaller than the thickness of the second metal fitting 40*b*. The thickness of the first metal fitting 40*a*, however, can be greater than the thickness of the second metal fitting 40*b* in order to increase the strength of the first metal fitting 40*a* relative to the second metal fitting 40*b*, for example, in a case where the first metal fitting 40*a* and the second metal fitting 40*b* are made of the same material.

According to the above embodiment, the sturdiness of the connector 10 can be improved even in the case of the connector being reduced in size and height. For example, the sturdiness of the connector 10 is improved during and after the engagement between the connector 10 and the connection object 50 even in the case of the connector 10 being reduced in size and height.

In the connector 10, each first metal fitting 40*a* includes the first end portion 41*a*1 disposed at the first intersection portion R1 of the engagement projection 22 and also includes the second end portion 41*a*2 disposed at the second intersection portion R2 of the engagement projection 22. With this configuration, the connector 10 can reliably protect the intersection portions of the engagement projection 22, which tend to suffer defects, such as wear or breakage, during engagement and disengagement between the connector 10 and the connection object 50. The first metal fitting 40*a* covers part of the first insulator 20 at each intersection portion of the engagement projection 22, which can improve the sturdiness of the intersection portion of the first insulator 20. This reduces the occurrence of a problem, such as breakage of the engagement projection 22 of the first insulator 20, when the connection object 50 hits the first insulator 20 during engagement or disengagement between the connector 10 and the connection object 50. Accordingly, this reduces the likelihood of broken pieces of the first insulator 20 adhering to the first contacts 30 and leading to bad connection. As a result, the product reliability of the connector 10 is improved.

The first metal fitting 40*a* includes the first projected portion 41*a*3, which can protect the first intersection line L1 and the boundary region thereof in the first face 221 and the second face 222. The first metal fitting 40*a* includes the second projected portion 41*a*4, which can protect the second intersection line L2 and the boundary region thereof in the first face 221 and the third face 223. Accordingly, the sturdiness of the engagement projection 22 is further improved. This further improves the sturdiness of the first insulator 20. As a result, the advantageous effects related to the sturdiness and the reliability of the connector 10 can be further enhanced.

The first metal fitting 40*a* includes the third projected portion 41*a*5, which can protect the third intersection line L3 and the boundary region thereof in the second face 222 and the fourth face 224. The first metal fitting 40*a* includes the fourth projected portion 41*a*6, which can protect the fourth intersection line L4 and the boundary region thereof in the third face 223 and the fourth face 224. Accordingly, the sturdiness of the engagement projection 22 is further improved. This further improves the sturdiness of the first insulator 20. As a result, the advantageous effects related to the sturdiness and the reliability of the connector 10 can be further enhanced. For example, the third projected portion 41*a*5 and the fourth projected portion 41*a*6 can reduce the occurrence of wear or breakage of the corresponding portions of the engagement projection 22 when the connection object 50 is rotated, in a plane orthogonally intersecting the up-down direction, relative to the connector 10 during and after the engagement between the connector 10 and the connection object 50.

The first metal fitting 40*a* includes the fifth projected portion 41*a*7, which can protect the fifth intersection line L5 and the boundary region thereof in the first face 221 and the fourth face 224. Accordingly, the sturdiness of the engagement projection 22 is further improved. This further improves the sturdiness of the first insulator 20. As a result, the advantageous effects related to the sturdiness and the reliability of the connector 10 can be further enhanced. For example, during the engagement between the connector 10 and the connection object 50, the connection object 50 is likely to hit a portion of the engagement projection 22 along the fifth intersection line L5 and in the vicinity thereof in the first face 221 and the fourth face 224. The fifth projected portion 41*a*7 can reduce the occurrence of wear or breakage of the portion of the engagement projection 22 in the boundary region of the fifth intersection line L5.

The first metal fitting 40*a* includes at least one of the first flat surface S1, the second flat surface S2, the third flat surface S3, and the fourth flat surface S4, which can protect at least one of the first face 221, the second face 222, the third face 223, and the fourth face 224. Accordingly, the sturdiness of the engagement projection 22 is further improved. This further improves the sturdiness of the first insulator 20. As a result, the advantageous effects related to the sturdiness and the reliability of the connector 10 can be further enhanced.

The first metal fitting 40*a* seamlessly covers the first face 221, the second face 222, the third face 223, and the fourth face 224, as well as all the intersection lines therebetween, with a surface of the first metal fitting 40*a*, the surface orthogonally intersecting the thickness direction of the first metal fitting 40*a*. Accordingly, the first metal fitting 40*a* can cover and protect the first insulator 20, without the first insulator 20 being exposed, in the longitudinal end portion of the engagement projection 22. The first base portion 41*a*, which can provide such advantageous effects, is formed using metal drawing. Accordingly, the sturdiness of the engagement projection 22 is further improved. This further improves the sturdiness of the first insulator 20. As a result, the advantageous effects related to the sturdiness and the reliability of the connector 10 can be further enhanced.

The first flat surface S1 of the first base portion 41*a* is flush with the top surface of the engagement projection 22, and the second flat surface S2 and the third flat surface S3 of the first base portion 41*a* are flush with respective side surfaces of the engagement projection 22. The surfaces of the first metal fitting 40*a* and the first insulator 20 are connected together smoothly with no level difference. Accordingly, the sturdiness of the engagement projection 22 is further improved. This further improves the sturdiness of the first insulator 20. As a result, the advantageous effects related to the sturdiness and the reliability of the connector 10 can be further enhanced.

In the connector 10, each first metal fitting 40*a* attached to the engagement projection 22 and the corresponding second metal fitting 40*b* attached to a peripheral wall 23 are separate members. Compared with a known art in which the metal fitting is formed integrally as one piece, this reduces a negative impact caused due to the connection object 50 hitting a metal fitting during engagement. For example, when the connection object 50 hits a metal fitting at the engagement projection 22 or at the peripheral wall 23, the likelihood of the impact extending to the other metal fitting is reduced. This reduces the occurrence of breakage of the metal fittings that include the first metal fitting 40*a* and the second metal fitting 40*b*. The reduction of the occurrence of breakage of the metal fittings leads to a reduction in the occurrence of breakage of the first insulator 20 to which the metal fittings are attached. This improves the product reliability of the connector 10.

Assume that the connector 10 and the connection object 50 engage each other in a misaligned state and that the connection object 50 hits a second metal fitting 40*b* on the peripheral wall 23 during the engagement and causes the second metal fitting 40*b* and the peripheral wall 23 to deform and incline outward in the right-left direction. Even in this case, the likelihood of the impact extending to the engagement projection 22 is reduced. The deformation of the first metal fitting 40*a* can be reduced since the first metal fitting 40*a* and the second metal fitting 40*b* are separate members. Assume that the connection object 50 hits a first metal fitting 40*a* at the engagement projection 22 during engagement and causes the first metal fitting 40*a* and the engagement projection 22 to deform inward into the engagement projection 22 in the right-left direction. Even in this case, the likelihood of the impact extending to the peripheral wall 23 is reduced. The likelihood of deformation of the second metal fitting 40*b* can be reduced since the first metal fitting 40*a* and the second metal fitting 40*b* are separate members. Accordingly, the metal fittings behave differently and independently at the engagement projection 22 and at the peripheral wall 23. The behavior of the metal fitting at the engagement projection 22 does not readily propagate to the metal fitting at the peripheral wall 23, and vice versa. This reduces the occurrence of the breakage, and the metal fittings can perform expected functions reliably.

The reduction of the occurrence of breakage of the metal fittings and the first insulator 20 reduces the likelihood of displacement of the connector 10 and the connection object 50 relative to each other in the contact arrangement direction, in other words, in the longitudinal direction of the connector 10, during and after the engagement. As a result, electrical continuity between the first contacts 30 and the corresponding second contacts 70 can be achieved exactly as specified in design. The likelihood of the connector module 1 loosening can be also reduced after the engagement. Positioning function of the connector 10 and the connection object 50 relative to each other can be maintained. As a result, the connector 10 and the connection object 50 do not come off easily from each other, which improves the product reliability of the connector module 1.

In the connector 10, the first metal fitting 40*a* and the second metal fitting 40*b* are different members, which enables the strength of one of the first metal fitting 40*a* and the second metal fitting 40*b* to increase relative to the other. In the connector 10, the first metal fitting 40*a* and the second metal fitting 40*b* are attached to different members, such as the engagement projection 22 and the peripheral wall 23, for the different purposes. The first metal fitting 40*a* and the second metal fitting 40*b* can be formed so as to have appropriate strengths suitable for the different positions and purposes. Assume that these metal fittings are formed integrally into one piece as is the case for the known art. When it is necessary to reduce the strength of a portion of the metal fitting at the engagement projection 22 or at the peripheral wall 23, the strength of the other portion of the metal fitting inevitably decreases.

For example, the first metal fitting 40*a* attached to the engagement projection 22 is provided for the purpose of improving the sturdiness of the engagement projection 22. On the other hand, the second metal fitting 40*b* attached to the peripheral wall 23 is provided mainly for the purpose of electrical connection with the metal fitting 80 in the engagement state. For this purpose, the second metal fitting 40*b* includes the elastically deformable contact arms 48*b*.

Accordingly, the second metal fitting 40*b* is preferably made of a material having a suitable strength to serve as a spring, while the first metal fitting 40*a* is preferably made of a material that is greater in strength. In the connector 10, the first metal fitting 40*a* and the second metal fitting 40*b* can be formed so as to have appropriate strengths suitable for respective purposes. If, for example, the metal fittings are formed integrally into one piece as is the case for the known art, the necessity to form elastically deformable contact arms at the peripheral wall leads to a decrease in the overall strength of the metal fitting, which results in a decrease in the sturdiness of the engagement projection.

In the connector 10, however, the material of the first metal fitting 40*a* is different from that of the second metal fitting 40*b*. These metal fittings can be formed easily so as to increase the strength of one of the first metal fitting 40*a* and the second metal fitting 40*b* relative to the strength of the other. For example, the materials of the first metal fitting 40*a* and the second metal fitting 40*b* can be selected appropriately to meet the objectives of these metal fittings.

The first metal fitting 40*a*, which is made of a material stronger than that of the second metal fitting 40*b*, improves the sturdiness of the engagement projection 22 to which the first metal fitting 40*a* is attached. This reduces the occurrence of breakage of the engagement projection 22 of the first insulator 20 to which the first metal fitting 40*a* is attached. As a result, the product reliability of the connector 10 is improved.

In the case of the first metal fitting 40*a* having a thickness greater than that of the second metal fitting 40*b*, the strength of the first metal fitting 40*a* becomes greater than that of the second metal fitting 40*b* even if, for example, the first metal fitting 40*a* and the second metal fitting 40*b* are made of the same material. With this configuration, the sturdiness of the engagement projection 22 to which the first metal fitting 40*a* is attached can be also increased.

The first metal fittings 40*a* are attached to respective opposite ends of the engagement projection 22 in the longitudinal direction of the connector 10, which improves the sturdiness of the engagement projection 22 at both ends. This further reduces the occurrence of breakage of the engagement projection 22 of the first insulator 20 to which the first metal fittings 40*a* are attached. As a result, the product reliability of the connector 10 is further improved.

In the connector 10, each first metal fitting 40*a* includes the mount portion 45*a* to be mounted on the circuit substrate CB1, which improves the sturdiness of the first metal fitting 40*a*. This reduces the deformation of the first metal fitting 40*a* even when a load is applied thereto. As a result, dimensional accuracy and shape integrity of the connector 10 can be maintained during the engagement. This improves, for example, the sturdiness of the engagement projection 22 to which the first metal fitting 40*a* is attached. This can reduce the occurrence of breakage or deformation of the engagement projection 22 and can reduce the likelihood of the connector 10 loosening or being displaced in the longitudinal direction.

The mount portion 45*a* includes the bottom surface of the second base portion 43*a*. The second base portion 43*a* extends in the longitudinal direction of the connector 10, and the bottom surface faces the circuit substrate CB1. Accordingly, the mount portion 45*a* can receive the external force acting on the first metal fitting 40*a*. The mount portion 45*a* is fixed to the circuit substrate CB1, and the first metal fitting 40*a* is thereby fixed to the circuit substrate CB1. As a result, even if an external force acts on the first metal fitting 40*a*, the mount portion 45*a* can absorb the resulted impact. This improves the sturdiness of the first metal fitting 40*a* extending in the longitudinal direction of the connector 10. This further improves the sturdiness of the engagement projection 22 extending also in the longitudinal direction of the connector 10.

The first metal fitting 40*a* superposes the one first contact 30 positioned at each end of the row of the first contacts 30 in the arrangement direction, which can reduce the length of the connector 10 in the longitudinal direction. This can reduce the longitudinal length of the connector module 1 and contribute to the overall size reduction of the connector module 1. Moreover, this improves the strength of the connector module 1 against external force.

The tip end 42*a*1 of the hook portion 42*a* of the first metal fitting 40*a* is positioned between the one first contact 30 and the adjacent first contact 30 in the arrangement direction. As a result, an arbitrarily shaped tip end structure of the hook portion 42*a* is positioned where a first-contact mounting groove 24 is not formed and the first insulator 20 has a larger thickness. This increases the holding strength of the first insulator 20 holding the tip end 42*a*1 of the hook portion 42*a*. Consequently, this increases the holding strength of the first insulator 20 holding the first metal fitting 40*a*. In addition, the arbitrarily shaped tip end structure of the hook portion 42*a* is positioned where the first insulator 20 has a larger thickness. This suppresses the stiffness reduction of the engagement projection 22 of the first insulator 20 compared with the case in which the tip end structure of the hook portion 42*a* is positioned where the first-contact mounting groove 24 is formed.

The hook portion 42*a* is shaped like the letter L, and the tip end 42*a*1 of the hook portion 42*a* is embedded in the engagement projection 22, which reduces the likelihood of the hook portion 42*a* being turned up. This increases the holding strength of the first insulator 20 holding the hook portion 42*a*. Consequently, this increases the holding strength of the first insulator 20 holding the first metal fitting 40*a*.

The first base portion 41*a* and the second base portion 43*a* are formed integrally so as to have the crank-like shape. Accordingly, the entire first metal fitting 40*a* integrally fits the first insulator 20 so as to follow the shape of the end portion of the engagement projection 22 and the shape of the bottom plate 21. This increases the holding strength of the first insulator 20 holding the first metal fitting 40*a*.

The width of the hook portion 42*a* is smaller than the width of any other portion of the first metal fitting 40*a* in the transverse direction of the connector 10. This increases the thickness of the first insulator 20 where the hook portion 42*a* is embedded. For example, even if the hook portion 42*a* superposes the one first contact 30 positioned at the end in the arrangement direction, in other words, the hook portion 42*a* superposes the first-contact mounting groove 24, the strength of the first insulator 20 can be maintained because the width of the hook portion 42*a* is small. As a result, the sturdiness of the connector 10 improves.

The second base portion 43*a* of each first metal fitting 40*a* extends in the longitudinal direction of the connector 10 from the engagement projection 22 to the corresponding transverse wall 23*a* to which a second metal fitting 40*b* is attached. This improves the sturdiness of the first metal fitting 40*a* extending in the longitudinal direction of the connector 10. Consequently, this improves the sturdiness of the engagement projection 22 extending in the longitudinal direction of the connector 10. The same effect can be obtained between the engagement projection 22 and the corresponding transverse wall 23*a* that are spaced from each other in the longitudinal direction of the connector 10. Even if the connection object 50 hits one of the metal fittings at the engagement projection 22 or at the transverse wall 23*a*, the likelihood of the impact extending to the other one of the metal fittings is reduced.

The first mount portions 44*b* of the second metal fitting 40*b* are also disposed respectively at both sides of the first metal fitting 40*a* in the transverse direction of the connector 10. The second mount portions 49*b* of the second metal fitting 40*b* are disposed respectively at both sides of the first metal fitting 40*a* in the transverse direction of the connector 10. The above structure increases the mounting strength of the second metal fitting 40*b* mounted on the circuit substrate CB1. This improves the sturdiness of the second metal fitting 40*b* and the transverse wall 23*a* in the right-left direction.

A pair of the first mount portions 44*b* are disposed substantially at the same position as the mount portion 45*a* in the right-left direction. Accordingly, three mount portions are aligned along an imaginary line extending in the front-rear direction. This increases the mounting strength of the connector 10 mounted on the circuit substrate CB1. Even if the connection object 50 and the connector 10 engage each other in a misaligned state in which the connection object 50 is, for example, rotated relative to the connector 10 by a certain degree about an axis extending in the up-down direction, the connector 10 remains to be mounted on the circuit substrate CB1. Similarly, even if the circuit substrate CB1 having the connector 10 mounted thereon is rotated after the engagement, the connector 10 remains to be mounted on the circuit substrate CB1. Accordingly, the sturdiness of the connector 10 mounted on the circuit substrate CB1 improves.

Portions of the second metal fitting 40*b* are disposed at both sides of the second base portion 43*a* of the first metal fitting 40*a* in the transverse direction of the connector 10. Accordingly, the attaching area of the second metal fitting 40*b* to be attached to the first insulator 20 increases. Consequently, this increases the mounting strength of the second metal fitting 40*b* mounted on the first insulator 20.

The second metal fittings 40*b* are attached to respective transverse walls 23*a*, which improves the sturdiness of the transverse walls 23*a* at both ends of each peripheral wall 23 extending in the right-left direction. This further reduces the occurrence of breakage of the transverse walls 23*a* of the first insulator 20 to which respective second metal fittings 40*b* are attached. As a result, the product reliability of the connector 10 is further improved.

Each second metal fitting 40*b* includes the elastically deformable contact arms 48*b* that come into contact with the corresponding metal fitting 80 in the engagement state. The contact arms 48*b*, which exert clastic forces to the metal fitting 80, can reliably maintain the state of connection with the metal fitting 80. Accordingly, the electrical continuity can be maintained reliably between the second metal fitting 40*b* and the metal fitting 80 in the engagement state.

The first metal fitting 40*a* and the second metal fitting 40*b*, which are spaced from each other, oppose each other in the right-left direction, and the metal fitting 80 of the connection object 50 is positioned between the first metal fitting 40*a* and the second metal fitting 40*b* in the engagement state in which the connector 10 and the connection object 50 engage each other. The structure in which the metal fitting 80 is interposed between the first metal fitting 40*a* and the second metal fitting 40*b* in the engagement state reduces the likelihood of the connector module 1 loosening after the engagement. As a result, the dimensional accuracy and the shape integrity of the connector 10 can be maintained during the engagement. Positioning function of the connector 10 and the connection object 50 relative to each other can be maintained even after the engagement. As a result, the connector 10 and the connection object 50 do not come off easily from each other, which improves the product reliability of the connector module 1.

The first metal fitting 40*a* and the first insulator 20 are formed integrally using insert molding, which further improves the sturdiness of the first metal fitting 40*a* and the engagement projection 22. The second base portion 43*a* of each first metal fitting 40*a* is formed integrally in the second cavity 252 of the first-metal-fitting holding portion 25 in the bottom plate 21, in other words, the second base portion 43*a* is formed integrally with the first insulator 20. This increases the contact area between the first metal fitting 40*a* and the first insulator 20. This increases the holding strength of the first insulator 20 holding the first metal fitting 40*a*, which are formed by insert molding. This further improves the sturdiness of the first metal fitting 40*a* and the engagement projection 22. The wide portion 44*a* of the first metal fitting 40*a* is embedded in the bottom plate 21 in the second cavity 252 of the first-metal-fitting holding portion 25, which further enhances the above-described advantageous effects.

Those skilled in the art can obviously implement the present disclosure in a form other than the above-described embodiment without departing from the spirit or the essential features of the present disclosure. As such, the above description is only illustrative and should not be construed as limiting. The scope of the disclosure is not limited by the above description but by the appended claims. Variations that fall within the scope of the claim or the equivalents thereof are to be included in the present disclosure.

For example, the shapes, arrangements, and orientations of elements as well as the number of elements are not limited to what is disclosed in the above description and in the drawings. The shapes, arrangements, and orientations of elements as well as the number of elements may be changed arbitrarily insofar as the specified functions can be implemented.

For example, in the connector 10, the second metal fittings 40*b* may be integrated into the first insulator 20 by insert molding rather than by press-fitting. For example, in the connector 10, the first metal fittings 40*a* may be attached to the first insulator 20 by press-fitting rather than by insert molding.

In the above description of the embodiment, a single first metal fitting 40*a* is disposed at each end of the engagement projection 22 in the right-left direction. The first metal fitting 40*a*, however, may be made of a pair of members that are spaced from each other and are disposed as the first end portion 41*a*1 and the second end portion 41*a*2, respectively. In other words, the first metal fitting 40*a* consists of multiple members.

In the above description of the embodiment, the first metal fitting 40*a* includes the first projected portion 41*a*3 and the second projected portion 41*a*4. The first metal fitting 40*a*, however, may include only one of the first projected portion 41*a*3 and the second projected portion 41*a*4 or may include neither of these.

In the above description of the embodiment, the first metal fitting 40*a* includes the third projected portion 41*a*5 and the fourth projected portion 41*a*6. The first metal fitting 40*a*, however, may include only one of the third projected portion 41*a*5 and the fourth projected portion 41*a*6 or may include neither of these.

In the above description of the embodiment, the first metal fitting 40*a* includes the fifth projected portion 41*a*7. The first metal fitting 40*a*, however, does not need to include the fifth projected portion 41*a*7.

In the above description of the embodiment, the first metal fitting 40*a* includes the first flat surface S1, the second flat surface S2, the third flat surface S3, and the fourth flat surface S4. The first metal fitting 40*a*, however, may include at least one of the first flat surface S1, the second flat surface S2, the third flat surface S3, and the fourth flat surface S4, or may include neither of these. The first metal fitting 40*a* may include at least one of curved surfaces that correspond to respective ones of the first flat surface S1, the second flat surface S2, the third flat surface S3, and the fourth flat surface S4.

In the above description of the embodiment, the first metal fitting 40*a* seamlessly covers the first face 221, the second face 222, the third face 223, and the fourth face 224, as well as all the intersection lines therebetween, with a surface of the first metal fitting 40*a*, the surface orthogonally intersecting the thickness direction of the first metal fitting 40*a* in the longitudinal end portion of the engagement projection 22. The first metal fitting 40*a* may be formed so as to have an arbitrary shape using an arbitrary method other than the metal drawing insofar as the first metal fitting 40*a* includes the first end portion 41*a*1 and the second end portion 41*a*2.

In the above description of the embodiment, the first metal fitting 40*a* and the second metal fitting 40*b* are separated from each other. However, the first metal fitting 40*a* and the second metal fitting 40*b* do not need to be separated but may be connected. In this case, the first metal fitting 40*a* and the second metal fitting 40*b* may be formed integrally but may have different strengths. For example, the metal fitting in which the first metal fitting 40*a* and the second metal fitting 40*b* are integrated may be made of a functionally graded material. More specifically, the material of the portion of the first metal fitting 40*a* may be different from the material of the portion of the second metal fitting 40*b* so as to have a greater strength. For example, the metal fitting in which the first metal fitting 40*a* and the second metal fitting 40*b* are integrated may be formed so as to have different thicknesses. More specifically, the thickness of the portion of the first metal fitting 40*a* may be greater than that of the portion of the second metal fittings 40*b*.

In the above description of the embodiment, the strength of the first metal fitting 40*a* is greater than the strength of the second metal fitting 40*b*. However, the strength of the second metal fitting 40*b* may be greater than that of the first metal fitting 40*a*.

In the above description of the embodiment, the thickness of the first metal fitting 40*a* is greater than the thickness of the second metal fitting 40*b* in order to increase the strength of the first metal fitting 40*a* relative to the strength of the second metal fitting 40*b*. For example, the thickness of the first metal fitting 40*a* may be smaller than that of the second metal fitting 40*b*, and the strength of the first metal fitting 40*a* may be greater than that of the second metal fitting 40*b*. On the contrary, the thickness of the first metal fitting 40*a* may be greater than that of the second metal fitting 40*b*, and the strength of the first metal fitting 40*a* may be smaller than that of the second metal fitting 40*b*.

In the above description of the embodiment, each first metal fitting 40*a* superposes the one first contact 30 in the arrangement direction. The first metal fitting 40*a*, however, does not need to superpose the one first contact 30 in the arrangement direction if the size reduction of the connector 10 in the longitudinal direction can be achieved using a different method.

In the above description of the embodiment, the tip end 42*a*1 of the hook portion 42*a* of each first metal fitting 40*a* is positioned between the one first contact 30 and the adjacent first contact 30 in the arrangement direction. However, the tip end 42*a*1 of the hook portion 42*a* of the first metal fitting 40*a* may be disposed, in the right-left direction, at a position corresponding to the position at which, for example, a first contact 30 is attached to the first insulator 20, insofar as the holding strength of the first insulator 20 holding the tip end 42*a*1 of the hook portion 42*a* can be maintained.

In the above description of the embodiment, the hook portion 42*a* is shaped like the letter L, and the tip end 42*a*1 of the hook portion 42*a* is embedded inside the engagement projection 22. The hook portion 42*a*, however, may have any shape other than the shape like the letter L insofar as the holding strength of the first insulator 20 holding the hook portion 42*a* can be maintained. In addition, the tip end 42*a*1 of the hook portion 42*a* does not need to be embedded inside the engagement projection 22.

In the above description of the embodiment, the width of the hook portion 42*a* is smaller than the width of any other portion of the first metal fitting 40*a* in the transverse direction of the connector 10. The hook portion 42*a*, however, may have the same width as that of any other portion of the first metal fitting 40*a* insofar as the strength of the first insulator 20 can be maintained.

In the above description of the embodiment, the second base portion 43*a* extends from the engagement projection 22 to the corresponding transverse wall 23*a* to which the second metal fitting 40*b* is attached. The second base portion 43*a*, however, may extend by an arbitrary length from the engagement projection 22 toward the transverse wall 23*a* if the sturdiness of the first metal fitting 40*a* improves in the longitudinal direction of the connector 10.

In the above description of the embodiment, the mount portion 45*a* is positioned directly below the transverse wall 23*a*. The mount portion 45*a*, however, may be disposed at a position near the engagement projection 22 and near a portion of the first metal fitting 40*a* on which an external force is likely to act.

In the above description of the embodiment, each second metal fitting 40*b* is attached to the corresponding transverse wall 23*a*. The second metal fitting 40*b*, however, does not need to be attached to the transverse wall 23*a* and may be attached, for example, only to the longitudinal walls 23*b*.

In the above description of the embodiment, the first mount portions 44*b* of the second metal fitting 40*b* are disposed respectively at both sides of the first metal fitting 40*a* in the transverse direction of the connector 10, and the second mount portions 49*b* of the second metal fitting 40*b* are also disposed respectively at both sides of the first metal fitting 40*a* in the transverse direction of the connector 10. However, either the first mount portions 44*b* or the second mount portions 49*b* may be disposed respectively at both sides of the first metal fitting 40*a* in the transverse direction of the connector 10. Only one first mount portion 44*b* or three or more first mount portions 44*b* may be provided rather than the two first mount portions 44*b*. Similarly, only one second mount portion 49*b* or three or more second mount portions 49*b* may be provided rather than the two second mount portions 49*b*.

In the above description of the embodiment, each second metal fitting 40*b* includes the elastically deformable contact arms 48*b* that come into contact with the metal fitting 80 of the connection object 50 in the engagement state. The second metal fitting 40*b*, however, may come into contact with the metal fitting 80 without deforming elastically. Moreover, the second metal fitting 40*b* does not need to come into contact with the metal fitting 80.

In the above description of the embodiment, the first face 221, the second face 222, the third face 223, and the fourth face 224 of the engagement projection 22 of the first insulator 20 are all flat faces. However, the first face 221, the second face 222, the third face 223, and the fourth face 224 may be curved. The first intersection line L1, the second intersection line L2, the third intersection line L3, the fourth intersection line L4, and the fifth intersection line L5 may be curved lines instead of the straight lines. The first intersection portion R1 and the second intersection portion R2 are not limited to angular corner portions, each including one intersection at which three planes intersect. The first intersection portion R1 and the second intersection portion R2 may be shaped as rounded corner portions.

The connector module 1, the connector 10, and the connection object 50 described above are mounted in an electronic apparatus that includes the circuit substrate CB1 and the circuit substrate CB2. For example, the type of electronic apparatus may be any communication terminal equipment, such as a smartphone, and any information processing equipment, such as a personal computer, a copier, a printer, a facsimile, or a multifunction printer. For example, the type of electronic apparatus may be any onboard equipment, such as a camera, a radar, a car digital video recorder, or an engine control unit. For example, the type of electronic apparatus may be any other onboard equipment to be used in an onboard system, such as a car navigation system, an advanced driver-assistance system, or a security system. Moreover, the type of electronic apparatus may be any arbitrary industrial equipment.

According to the above-described electronic apparatus, the sturdiness of the connector 10 is improved during the engagement between the connector 10 and the connection object 50 even in the case of the connector 10 being reduced in size and height. This improves the product reliability of the electronic apparatus.

REFERENCE SIGNS

1 connector module
10 connector
20 first insulator (insulator)
21 bottom plate
22 engagement projection
221 first face
222 second face
223 third face
224 fourth face
23 peripheral wall
23*a* transverse wall
23*b* longitudinal wall
24 first-contact mounting groove
25 first-metal-fitting holding portion
251 first cavity
252 second cavity
253 third cavity
26 second-metal-fitting mounting portion
261*a* first wall portion
261*b* second wall portion
262 third wall portion
263 fourth wall portion
264 first mounting groove
265 second mounting groove
30 first contact
31 mount portion
32 locking portion
33 curved portion
34 elastic contact arm
35 elastic contact point
36 contact point
40*a* first metal fitting
41*a* first base portion
41*a*1 first end portion
41*a*2 second end portion
41*a*3 first projected portion
41*a*4 second projected portion
41*a*5 third projected portion
41*a*6 fourth projected portion
41*a*7 fifth projected portion
42*a* hook portion
42*a*1 tip end
43*a* second base portion
44*a* wide portion
45*a* mount portion
46*a* contact portion
40*b* second metal fitting
41*b* first base portion
42*b* second base portion
43*b* protruding portion
44*b* first mount portion
45*b*1 locking portion
45*b*2 locking portion
46*b* curved portion
47*b* inside edge
48*b* contact arm
49*b* second mount portion
50 connection object
60 second insulator
61 bottom plate
62 peripheral wall
62*a* transverse wall
62*b* longitudinal wall
63 engagement recess
64 second-contact holding portion
65 metal-fitting holding portion
70 second contact
71 mount portion
72 curved portion
73 contact point
80 metal fitting
81 base portion
82 first extension portion
83 second extension portion
84 contact point
85 mount portion
CB1 circuit substrate (first circuit substrate)
CB2 circuit substrate (second circuit substrate)
L1 first intersection line
L2 second intersection line
L3 third intersection line
LA fourth intersection line
L5 fifth intersection line
R1 first intersection portion
R2 second intersection portion
S1 first flat surface
S2 second flat surface
S3 third flat surface
S4 fourth flat surface

The invention claimed is:

1. A connector configured to engage a connection object, the connector comprising:
an insulator comprising
an engagement projection projecting toward an engagement side where the connector engages the connection object and
a peripheral wall surrounding the engagement projection; and
a first metal fitting attached to the engagement projection,
wherein the engagement projection comprises
a first face that is an end face facing the engagement side,
a second face and a third face both extending toward a side opposite to the engagement side from respective edges of the first face, the respective edges extending in a longitudinal direction of the connector, and
a fourth face extending toward the side opposite to the engagement side from an edge of the first face, the edge extending in a transverse direction of the connector, and wherein the first metal fitting comprises a first end portion positioned at a first intersection portion at which the first face, the second face, and the fourth face intersect, the first end portion covering part of the first face, part of the second face, and part of the fourth face, and a second end portion positioned at a second intersection portion at which the first face, the third face, and the fourth face intersect, the second end portion covering part of the first face, part of the third face, and part of the fourth face.

2. The connector according to claim 1, wherein the first metal fitting comprises at least one of a first projected portion and a second projected portion, wherein the first projected portion extends in the longitudinal direction from the first end portion along a first intersection line between the first face and the second face and covers a boundary region of the first intersection line in the first face and the second face, and wherein the second projected portion extends in the longitudinal direction from the second end portion along a second intersection line between the first face and the third face and covers a boundary region of the second intersection line in the first face and the third face.

3. The connector according to claim 1, wherein the first metal fitting comprises a fifth projected portion, and wherein the fifth projected portion extends between the first end portion and the second end portion along a fifth intersection line between the first face and the fourth face and covers a boundary region of the fifth intersection line in the first face and the fourth face.

4. The connector according to claim 1, wherein the first metal fitting comprises at least one of a third projected portion and a fourth projected portion, wherein the third projected portion extends from the first end portion toward the side opposite to the engagement side along a third intersection line between the second face and the fourth face and covers a boundary region of the third intersection line in the second face and the fourth face, and wherein the fourth projected portion extends from the second end portion toward the side opposite to the engagement side along a fourth intersection line between the third face and the fourth face and covers a boundary region of the fourth intersection line in the third face and the fourth face.

5. The connector according to claim 1, wherein the first metal fitting comprises at least one of a first flat surface disposed along the first face, a second flat surface disposed along the second face, a third flat surface disposed along the third face, and a fourth flat surface disposed along the fourth face.

6. The connector according to claim 1, wherein, in a longitudinal end portion of the engagement projection, the first metal fitting seamlessly covers the first face, the second face, the third face, and the fourth face, as well as all the intersection lines therebetween, with a surface of the first metal fitting, the surface orthogonally intersecting a thickness direction of the first metal fitting.

7. The connector according to claim 1, further comprising:

a second metal fitting attached to the peripheral wall, wherein the first metal fitting and the second metal fitting are separate members.

8. The connector according to claim 7, wherein the first metal fitting and the second metal fitting are spaced from each other.

9. The connector according to claim 1, wherein the first metal fitting comprises a second base portion extending in the longitudinal direction and a mount portion to be mounted onto a circuit substrate, and wherein the mount portion comprises a bottom surface of the second base portion, the bottom surface being positioned in a longitudinal end portion of the second base portion and facing the circuit substrate.

10. The connector according to claim 9, wherein the first metal fitting comprises a first base portion extending from the second base portion, and wherein the first base portion and the second base portion are made integrally and have a crank-like shape.

11. The connector according to claim 9, wherein the peripheral wall comprises a longitudinal wall and a transverse wall, and wherein the second base portion extends from the engagement projection to the transverse wall.

12. The connector according to claim 1, wherein the insulator and the first metal fitting are formed integrally using insert molding.

13. The connector according to claim 1, wherein the connector is mounted on a first circuit substrate and connected to the connection object mounted on a second circuit substrate.

14. An electronic apparatus comprising:

the connector according claim 1.

* * * * *